US008627095B2

(12) United States Patent
Asano

(10) Patent No.: US 8,627,095 B2
(45) Date of Patent: Jan. 7, 2014

(54) INFORMATION PROCESSING APPARATUS, INFORMATION PROCESSING METHOD, AND PROGRAM

(75) Inventor: Tomoyuki Asano, Kanagawa (JP)

(73) Assignee: Sony Corporation, Tokyo (JP)

( * ) Notice: Subject to any disclaimer, the term of this patent is extended or adjusted under 35 U.S.C. 154(b) by 358 days.

(21) Appl. No.: 12/891,132

(22) Filed: Sep. 27, 2010

(65) Prior Publication Data

US 2011/0126280 A1    May 26, 2011

(30) Foreign Application Priority Data

Nov. 20, 2009    (JP) .................................. 2009-264821

(51) Int. Cl.
G06F 21/00    (2013.01)
(52) U.S. Cl.
USPC ........ 713/186; 726/5; 726/6; 726/18; 726/19; 726/28; 340/5.52; 340/5.82
(58) Field of Classification Search
USPC ................. 713/182–186; 726/5, 6, 18, 19, 28
See application file for complete search history.

(56) References Cited

U.S. PATENT DOCUMENTS

| 5,534,855 | A  | * | 7/1996 | Shockley et al. | ............. | 340/5.52 |
| 6,732,278 | B2 | * | 5/2004 | Baird et al. | ......................... | 726/7 |
| 7,478,068 | B2 | * | 1/2009 | Maritzen et al. | ................ | 705/51 |
| 7,512,567 | B2 | * | 3/2009 | Bemmel et al. | ................. | 705/67 |
| 7,877,790 | B2 | * | 1/2011 | Vishik et al. | ....................... | 726/5 |
| 8,234,220 | B2 | * | 7/2012 | Weiss | ............................... | 705/68 |
| 2007/0011463 | A1 | * | 1/2007 | Garfinkle | ...................... | 713/186 |
| 2007/0019845 | A1 |   | 1/2007 | Kato | | |
| 2007/0143628 | A1 | * | 6/2007 | Genda | ........................... | 713/183 |
| 2008/0034411 | A1 | * | 2/2008 | Aoyama | ........................... | 726/5 |
| 2008/0184349 | A1 | * | 7/2008 | Ting | ................................... | 726/7 |
| 2009/0292927 | A1 | * | 11/2009 | Wenzel et al. | ................ | 713/185 |
| 2010/0017616 | A1 | * | 1/2010 | Nichols et al. | ................ | 713/183 |
| 2010/0146608 | A1 | * | 6/2010 | Batie et al. | ........................ | 726/7 |

FOREIGN PATENT DOCUMENTS

| JP | 2003-150557 | | 5/2003 |
| JP | 2006-163875 | | 6/2006 |
| JP | 2006163875 A | * | 6/2006 |
| JP | 2007-34521 | | 2/2007 |
| JP | 2007-226293 | | 9/2007 |

* cited by examiner

*Primary Examiner* — Jeffrey Pwu
*Assistant Examiner* — Jayesh Jhaveri
(74) *Attorney, Agent, or Firm* — Oblon, Spivak, McClelland, Maier & Neustadt, L.L.P.

(57) ABSTRACT

An information processing apparatus according to the present invention includes a biometric authentication unit that authenticates one piece of biometric information based on registered biometric information, wherein the one piece of biometric information is image information unique to a living body, and a plurality of pieces of user information are associated with the one piece of biometric information, and the registered biometric information is biometric information registered in advance, and a login processing unit that selects, based on user specification information for specifying user information used for login processing, one of the plurality of pieces of user information associated with the biometric information successfully authenticated by the biometric authentication unit so that the login processing unit uses the selected one of the plurality of pieces of user information to perform the login processing.

20 Claims, 15 Drawing Sheets

FIG.2

| ACCOUNT ID | AUTHORITY | PASSWORD | REGISTERED BIOMETRIC INFORMATION |
|---|---|---|---|
| AAAA | ADMINISTRATOR | aaaa | 0xABCDEF01 |
| BBBB | ORDINARY USER | bbbb | 0x98765432 |
| CCCC | ORDINARY USER | cccc | — |
| DDDD | ORDINARY USER | dddd | 0xABCDEF01 |
| ⋮ | ⋮ | ⋮ | ⋮ |

FIG.6

| ACCOUNT ID | AUTHORITY | PASSWORD | REGISTERED BIOMETRIC INFORMATION | DEFAULT |
|---|---|---|---|---|
| AAAA | ADMINISTRATOR | aaaa | 0xABCDEF01 | — |
| BBBB | ORDINARY USER | bbbb | 0x98765432 | ○ |
| CCCC | ORDINARY USER | cccc | — | — |
| DDDD | ORDINARY USER | dddd | 0xABCDEF01 | ○ |
| ... | ... | ... | ... | ... |

FIG.9

| ACCOUNT ID | AUTHORITY | PASSWORD | REGISTERED BIOMETRIC INFORMATION | ADDITIONAL OPERATION |
|---|---|---|---|---|
| AAAA | ADMINISTRATOR | aaaa | 0xABCDEF01 | F1 KEY |
| BBBB | ORDINARY USER | bbbb | 0x98765432 | — |
| CCCC | ORDINARY USER | cccc | — | — |
| DDDD | ORDINARY USER | dddd | 0xABCDEF01 | — |
| ... | ... | ... | ... | ... |

FIG.12

| ACCOUNT ID | AUTHORITY | PASSWORD | REGISTERED BIOMETRIC INFORMATION | MANAGEMENT METHOD | ADDITIONAL INFORMATION |
|---|---|---|---|---|---|
| AAAA | ADMINISTRATOR | aaaa | 0xABCDEF01 | ADDITIONAL OPERATION | F1 KEY |
| BBBB | ORDINARY USER | bbbb | 0x98765432 | DEFAULT | DEFAULT |
| CCCC | ORDINARY USER | cccc | — | — | — |
| DDDD | ORDINARY USER | dddd | 0xABCDEF01 | DEFAULT | DEFAULT |
| ... | ... | ... | ... | ... | ... |

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program.

2. Description of the Related Art

A user authentication technique using biometric information, i.e., information unique to a living body, such as a fingerprint and a finger vein is widely used. For example, when a user logs in to a certain system or apparatus such as an operating system controlling a personal computer (PC), a method for inputting a user account name and a password has been used in general. Nowadays, however, biometric information of the user in association with an account name is registered in advance, and the user can log in to a corresponding account by just presenting the biometric information of the user (for example, see Japanese Patent Application Laid-Open Nos. 2003-150557, 2006-163875, 2007-34521, and 2007-226293). In these systems, it is assumed that respectively different pieces of biometric information are registered to respectively different accounts in order to distinguish combinations of accounts and biometric information.

SUMMARY OF THE INVENTION

Now, a home PC is considered, for example. It is quite usual that a user having an administrator account of this PC is the same as a user having a user account for normally using a PC. Therefore, for example, in biometric authentication using a fingerprint and a finger vein, different pieces of biometric information are usually registered as follows. A user registers an index finger of the right hand to an administrator account, a middle finger of the left hand to an ordinary account, and another finger to a different account. In this case, the user has to remember which finger corresponds to which account, which increases the burden on the user. Therefore, there is an issue in that the convenience is reduced.

Further, biometric authentication methods include not only the method using fingerprints and the like but also a method using one unique portion existing on a living body such as a method using an image of a face. In this case, there is basically only one type of biometric information usable by one person. Therefore, it is difficult to register and present different biometric information for each account, as described above.

The present invention addresses the above-identified, and other issues associated with the methods and apparatuses in the related art, and provides an information processing apparatus, an information processing method, and a program allowing a user to easily log in to one of a plurality of user accounts possessed by the user using one piece of biometric information.

According to an embodiment of the present invention, there is provided an information processing apparatus including a biometric authentication unit that authenticates one piece of biometric information based on registered biometric information, and a login processing unit that selects, based on user specification information for specifying user information used for login processing, one of the plurality of pieces of user information associated with the biometric information successfully authenticated by the biometric authentication unit so that the login processing unit uses the selected one of the plurality of pieces of user information to perform the login processing. The one piece of biometric information is image information unique to a living body, and a plurality of pieces of user information are associated with the one piece of biometric information, and the registered biometric information is biometric information registered in advance.

When operation for switching user information is performed, the login processing unit may determine whether biometric information associated with new user information is the same as biometric information associated with current user information, and when the biometric information associated with the new user information is determined to be the same as the biometric information associated with the current user information, the login processing unit may perform login processing using the new user information without performing authentication processing.

In a case where newly registered user information is specified to be associated with already registered biometric information during registration of the new user information, the biometric authentication unit may associate the already registered biometric information with the newly generated user information when newly obtained biometric information and the already registered biometric information are successfully authenticated.

When the already registered biometric information is associated with the newly registered user information, the biometric authentication unit may also generate the user specification information to be referred to during login processing using the registered biometric information.

The login processing unit may display, on a display screen, an object representing a plurality of pieces of user information associated with the biometric information successfully authenticated, and may adopt, as the user specification information, information identifying the user information selected by a user.

The user information preferentially used for login processing may be previously set as the user specification information.

User specification information may include additional operation information about additionally-performed operation during login processing using predetermined user information, and the login processing unit may select the user information based on whether the additional operation is performed or not during the login processing.

According to an another embodiment of the present invention, there is provided an information processing method including the steps of authenticating one piece of biometric information based on registered biometric information, selecting, based on user specification information for specifying user information used for login processing, one of the plurality of pieces of user information associated with the successfully authenticated biometric information, and performing the login processing using the selected user information. The one piece of biometric information is image information unique to a living body, and a plurality of pieces of user information are associated with the one piece of biometric information, and the registered biometric information is biometric information registered in advance.

According to an another embodiment of the present invention, there is provided a program for causing a computer to realize a biometric authentication function of authenticating one piece of biometric information based on registered biometric information, and a login processing function of selecting, based on user specification information for specifying user information used for login processing, one of the plurality of pieces of user information associated with the biometric information successfully authenticated by the biometric authentication function so that the login processing function uses the selected one of the plurality of pieces of user information to perform the login processing. The one piece of biometric information is image information unique to a living body, and a plurality of pieces of user information are associated with the one piece of biometric information, and the registered biometric information is biometric information registered in advance.

As described above, according to of the present invention, a user can easily log in to one of a plurality of user accounts possessed by the user using one piece of biometric information.

BRIEF DESCRIPTION OF THE DRAWINGS

FIG. 2 is an explanatory diagram illustrating an example of user information in the information processing apparatus of the embodiment;

FIG. 6 is an explanatory diagram illustrating an example of user information according to a first modification of the information processing apparatus of the embodiment;

FIG. 9 is an explanatory diagram illustrating an example of user information according to a second modification of the information processing apparatus of the embodiment;

FIG. 12 is an explanatory diagram illustrating an example of user information according to a third modification of the information processing apparatus of the embodiment;

DETAILED DESCRIPTION OF THE EMBODIMENTS

Figure 1:
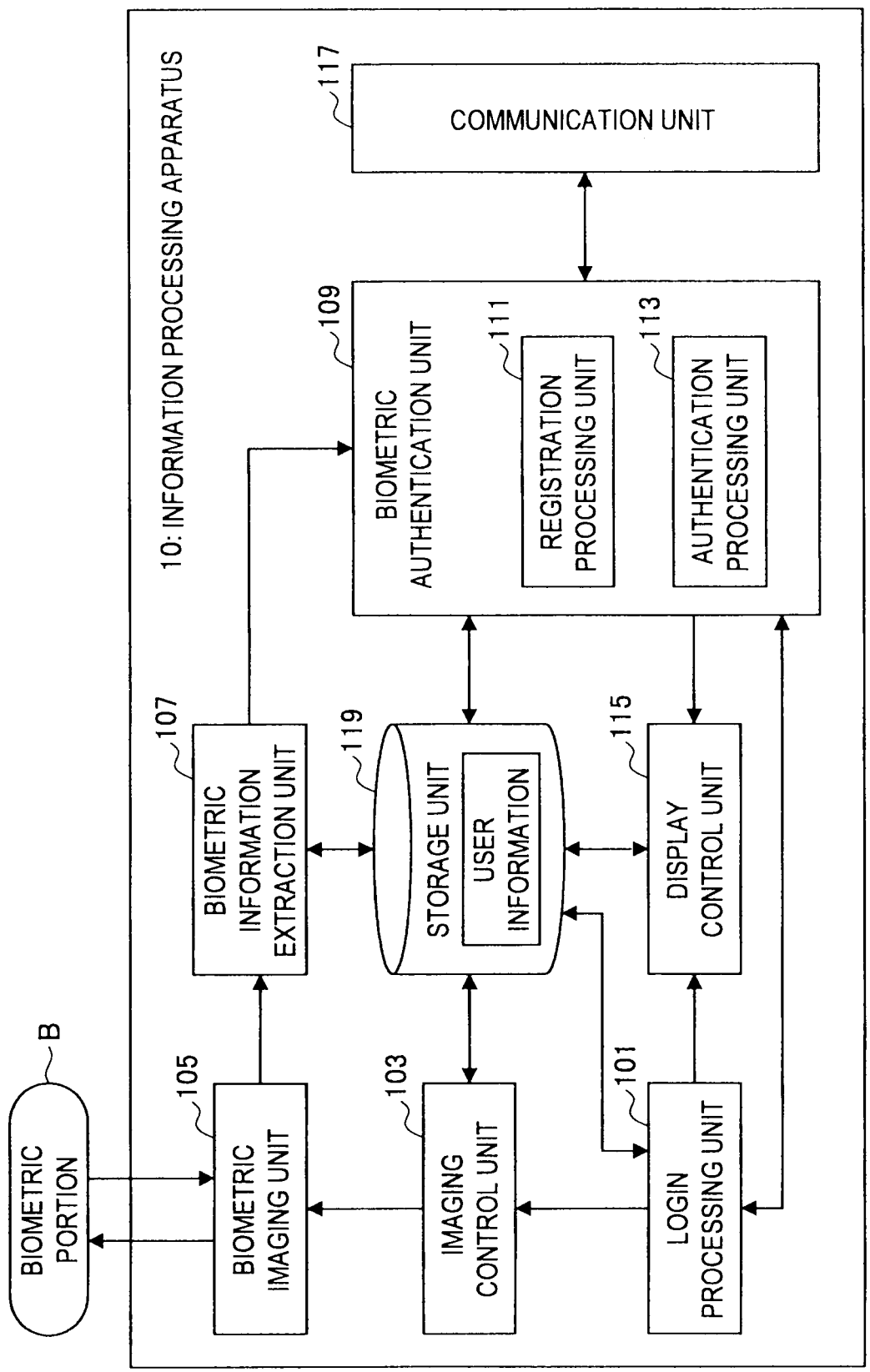
FIG. 1 is a block diagram illustrating a configuration of an information processing apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The explanation will be made in the following order.
(1) First embodiment
   (1-1) Configuration of information processing apparatus
   (1-2) Registration method of user information
   (1-3) Login processing method
   (1-4) Switching method of account
   (1-5) First modification
   (1-6) Second modification
   (1-7) Third modification
(2) Hardware configuration of information processing apparatus according to an embodiment of the present invention
(3) Summary (1) First Embodiment <Configuration of Information Processing Apparatus>

First, a configuration of an information processing apparatus according to a first embodiment of the present invention will be explained in detail with reference to FIGS. 1 and 2. FIG. 1 is a block diagram illustrating the configuration of the information processing apparatus according to the present embodiment. FIG. 2 is an explanatory diagram illustrating an example of user information in the information processing apparatus of the embodiment.

For example, as shown in FIG. 1, the information processing apparatus 10 according to the present embodiment mainly includes a login processing unit 101, an imaging control unit 103, a biometric imaging unit 105, a biometric information extraction unit 107, a biometric authentication unit 109, a display control unit 115, a communication unit 117, and a storage unit 119.

The login processing unit 101 according to the present embodiment is realized with, for example, a CPU (Central Processing Unit), a ROM (Read Only Memory), a RAM (Random Access Memory), and the like. For example, when the information processing apparatus 10 is turned on or a biometric portion of a user is located at a predetermined position of the information processing apparatus 10, the login processing unit 101 performs login processing in order to allow the user to use various functions and services provided by the information processing apparatus 10.

It should be noted that the login processing unit 101 can perform login processing using identification information and a password for distinguishing a user such as a user ID in the same manner as the related art. However, in the explanation below, login processing using biometric authentication processing performed by the login processing unit 101 will be explained in detail.

The login processing performed by the login processing unit 101 is carried out based on a biometric authentication result given by the later-explained biometric authentication unit 109. The login processing unit 101 performs login processing in a case where an authentication result indicating success of biometric authentication is notified from the biometric authentication unit 109. The login processing unit 101 outputs an error and does not perform login processing in a case where an authentication result indicating failure of biometric authentication is notified.

Further, when a user performs operation to request start of generation of an account, the login processing unit 101 starts generation of user information as described later in cooperation with each processing unit of the information processing apparatus 10.

First, the processing of generating user information will be explained.

When the user performs operation to request start of generation of an account, the login processing unit 101 starts processing of generating user information as shown in FIG. 2, for example. As shown in the example of FIG. 2, the user information includes an account ID, i.e., identification information uniquely given to user information, an authority given to a user corresponding to user information, and a password for proving the user to be an authentic user. Alternatively, when the user requests login processing using biometric authentication, the later-explained biometric authentication unit 109 registers biometric information (image information unique to a living body), and information representing a storage location of this registered biometric information is associated with user information. The information representing the storage location of this registered biometric information may be a memory address of a memory (secure memory) storing registered biometric information as shown in FIG. 2, for example, or may be a URL (Uniform Resource Locator) and the like representing a storage location.

Further, the number of pieces of user information allowed to be generated for each user is not limited to one piece. One user may have one piece of user information, or a plurality of pieces of user information according to a executable authority and an environment and the like in which the information processing apparatus is used.

Herein, in the information processing apparatus 10 according to the present embodiment, a plurality of pieces of user information can be associated with one piece of biometric information. Accordingly, when the user who requests generation of an account ID "DDDD" as shown in FIG. 2 uses registered biometric information associated with the account ID "AAAA" for the account ID "DDDD", each piece of user information contains information representing the same storage location. Thus, the user can have the plurality of pieces of user information associated with one piece of biometric information.

The user information as described above is generated by the login processing unit 101, and is stored in the later-explained storage unit 119 and the like. The user can thus possess the accounts for the information processing apparatus 10 according to the present embodiment. It should be noted that the user information may be stored in the storage unit 119 and the like in a manner as shown in an account management table of FIG. 2, or may be stored in the storage unit 119 and the like in a database manner. Alternatively, the user information may be stored in a server and the like arranged externally, instead of the information processing apparatus 10.

Subsequently, the login processing of the user will be explained.

When a biometric portion of the user is located at a predetermined position of the information processing apparatus 10, the login processing unit 101 requests the later-explained imaging control unit 103 to start taking an image of the predetermined biometric portion. Thereby, the biometric authentication using the predetermined biometric portion is started. Herein, examples of biometric authentications carried out by the information processing apparatus 10 according to the present embodiment include various kinds of biometric authentications such as fingerprint authentication, vein authentication, face authentication, iris authentication, and voiceprint authentication.

When the biometric authentication processing is started, the login processing unit 101 waits for a notification of an authentication result of the biometric authentication processing from the later-explained biometric authentication unit 109. When a failure of biometric information authentication is notified from the biometric authentication unit 109, the login processing unit 101 causes the later-explained display control unit 115 to display a message and the like indicating failure of authentication on a display unit (not shown), and terminates the login processing. When a success of biometric information authentication is notified from the biometric authentication unit 109, user information associated with registered biometric information determined to be similar to the biometric information is used to perform the login processing.

Herein, one piece of registered biometric information is associated with a plurality of pieces of user information, and there may be a case where the biometric authentication unit 109 notifies that the registered biometric information similar to the biometric information used for the authentication is associated with a plurality of pieces of user information. In this case, the login processing unit 101 refers to an account ID of the user information associated with the successfully authenticated registered biometric information notified by the biometric authentication unit 109. Thereafter, the login processing unit 101 causes the later-explained display control unit 115 to display a list and the like of accounts available for login on the display unit using objects such as icons and to display a message asking the user which account is used for login.

When the user selects an account for login, information identifying the account selected by the user is used as user specification information, i.e., information for specifying user information used for login processing. The login processing unit 101 performs the login processing using an account specified by the user (i.e., user information) based on this user specification information.

As described above, in the login processing to the information processing apparatus 10 according to the present embodiment, when the user having biometric information registered performs login processing, the user can start the login processing by just scanning the biometric portion over the information processing apparatus. Thus, the user does not have to perform operation such as inputting the account ID and the password in the same manner as the related art. On the other hand, when a plurality of accounts (user information) are associated with one piece of biometric information, a list of accounts available for login is displayed, and a user is prompted to make a selection. Therefore, a user having a plurality of accounts can perform the login processing in a simpler manner.

Subsequently, a switching processing (account switching processing) of user information will be explained.

For example, in a home PC and the like, an ordinary user authority is sufficient for everyday works. However, when a work for installing an application is performed, a processing in an account having an administrator authority may be required in some case. In such occasion, when the currently used account is authenticated by the login processing using biometric authentication processing, the information processing apparatus 10 according to the present embodiment performs switching processing of an account as shown below.

It is assumed that while the user is logged in to the information processing apparatus 10, the user performs operation to switch the account, and specifies user information of a new account (for example, account ID and the like) to which the current account is to be switched. At this occasion, the login processing unit 101 determines whether registered biometric information associated with the user information of the account currently being logged in is the same as registered biometric information associated with user information of the new account. When the registered biometric information is determined to be the same, the login processing unit 101 performs login processing again using the user information of the new account without performing the biometric authentication processing for authenticating the user information of the new account.

When the registered biometric information of the current account is determined not to be the same as the registered biometric information of the new account, the login processing unit 101 requests start of biometric authentication processing for authenticating the user information of the new account, and performs the same processing as the normal login processing using the biometric authentication processing.

As described above, in the switching method of the account according to the present embodiment, the processing making use of the feature of the biometric information being unique to the user is carried out. More specifically, the login processing unit 101 uses biometric authentication for the login processing of the currently used account, and when both of the current account and the new account are associated with the same registered biometric information, the login processing unit 101 performs switching of the account without performing the biometric authentication processing again. Therefore, the user of the information processing apparatus 10 can switch the account in a simpler manner, and the convenience for the user can be improved.

The registration processing of user information, the login processing, and the switching processing of the account as described above will be explained later in detail again.

Subsequently, the imaging control unit 103 will be explained.

The imaging control unit 103 is realized with, for example, a CPU, a ROM, a RAM, and the like. The imaging control unit 103 controls the later-explained biometric imaging unit 105 to generate image data (biometric image data) used for extracting biometric information. Thereafter, the imaging control unit 103 causes the later-explained biometric information extraction unit 107 to output biometric image data generated by the biometric imaging unit 105.

It should be noted that the imaging control unit 103 may cause the later-explained storage unit 119 to record the generated image data. When the image data are recorded in the storage unit 119, the imaging control unit 103 may associate the generated image data with a date, a time, and the like when the image data are taken. It should be noted that the generated biometric image data may be an RGB (Red-Green-Blue) signal, or may be image data in other colors or image data such as grayscale.

Under the control of the imaging control unit 103, the biometric imaging unit 105 takes an image of a biometric portion B located at a predetermined position of the information processing apparatus 10, and generates biometric image data. This biometric imaging unit 105 has an imaging optical unit (not shown) for taking an image of the biometric portion B. Further, when the information processing apparatus 10 according to the present embodiment performs biometric authentication processing which requires a special light source such as vein authentication processing, the information processing apparatus 10 may further include a light source unit (not shown) for emitting light having a predetermined wavelength to the biometric portion B.

The imaging optical unit includes imaging devices such as a CCD (Charge Coupled Devices) and a CMOS (Complementary Metal Oxide Semiconductor) and an optical system constituted by optical devices such as lenses.

The optical system constituting the imaging optical unit includes one or a plurality of optical devices and one or a plurality of imaging devices. The optical system of the imaging optical unit according to the present embodiment may be an optical system for imaging the biometric portion, or an optical system already existing may be used as the optical system for imaging the biometric portion. For example, when the information processing apparatus 10 according to the present embodiment is implemented in a portable apparatus such as a portable telephone, an optical system already implemented on the portable apparatus may be used as the optical system for imaging the biometric portion.

The biometric imaging unit 105 outputs the biometric image data generated by the imaging optical unit to the later-explained biometric information extraction unit 107.

The biometric information extraction unit 107 is realized with, for example, a CPU, a ROM, a RAM, and the like. The biometric information extraction unit 107 extracts biometric information using the biometric image data transmitted from the biometric imaging unit 105. For example, this biometric information extraction unit 107 has a function of extracting biometric information. In addition, the biometric information extraction unit 107 may have, as necessary, a function of performing preprocessing for extracting biometric information and a function of performing postprocessing on extracted biometric information.

Examples of preprocessing include a processing for extracting an outline and the like of biometric portion from biometric image data and determining where in the biometric image data the biometric portion is located. Another example of preprocessing is a processing for rotating biometric image data within a plane using an outline and the like of a detected biometric portion and correcting an angle of the biometric image data. Another example of preprocessing is a processing for removing noise overlapped on biometric image data.

The biometric information is extracted according to various methods suitable for biometric information to be extracted. Such extraction methods include various kinds of methods suggested according to the types of biometric information to be extracted such as fingerprint authentication, vein authentication, face authentication, iris authentication, and voiceprint authentication, and the information processing apparatus 10 according to the present embodiment can use any method according to biometric information to be extracted. The biometric information extraction unit 107 uses this extraction processing of biometric information to extract biometric information characterizing an imaged biometric portion (i.e., user). Examples of such biometric information include a position of a branching point or an end point of a fingerprint in fingerprint authentication, positions of an end point, a branching point, and a bending point of a vein in vein authentication, a position of a feature point such as an eye, a nose, and a mouth in face authentication, an iris code in iris authentication, a voiceprint in voiceprint authentication, and the like.

The biometric information extraction unit 107 transmits the thus extracted biometric information to the later-explained biometric authentication unit 109. Further, the biometric information extraction unit 107 may store extracted biometric information in the later-explained storage unit 119 and the like. It should be noted that the biometric information extraction unit 107 may refer to various kinds of databases and the like stored in the storage unit 119 and the like in order to perform each of the above processings, and may store generated parameters, progress of processing, and the like in the storage unit 119.

The biometric authentication unit 109 is realized with, for example, a CPU, a ROM, a RAM, and the like. The biometric authentication unit 109 registers biometric information transmitted from the biometric information extraction unit 107 as registered biometric information (hereinafter referred to as template), and authenticates the biometric information transmitted from the biometric information extraction unit 107 based on the registered biometric information. As shown in FIG. 1, for example, this biometric authentication unit 109 further includes a registration processing unit 111 and an authentication processing unit 113.

The registration processing unit 111 is realized with, for example, a CPU, a ROM, a RAM, and the like. While the information processing apparatus 10 according to the present embodiment performs registration processing of user information, the registration processing unit 111 registers biometric information transmitted from the biometric information extraction unit 107 as registered biometric information (template) in a predetermined position of the later-explained storage unit 119 and the like. At this occasion, the registration processing unit 111 refers to an account ID associated with user information in registration processing notified from the login processing unit 101, and associates the corresponding account ID with information representing the storage location of the registered biometric information. When storing of the registered biometric information and association of information representing the storage location with the user information are finished, the registration processing unit 111 notifies a notification indicating that the processing is finished to the login processing unit 101.

The authentication processing unit 113 is realized with, for example, a CPU, a ROM, a RAM, and the like. When the information processing apparatus 10 according to the present embodiment performs login processing of a user, the authentication processing unit 113 performs authentication processing of biometric information transmitted from the biometric information extraction unit 107. This authentication processing of the biometric information is performed using registered biometric information stored in the storage unit 119 and the like and biometric information transmitted from the biometric information extraction unit 107. The authentication processing unit 113 calculates the degree of similarity between all the registered biometric information and the biometric information transmitted from the biometric information extraction unit 107, and determines whether there is any registered biometric information whose calculated degree of similarity is equal to or more than a predetermined threshold value. When there is registered biometric information having the degree of similarity equal to or more than the threshold value, the authentication processing unit 113 determines that authentication of the user associated with the corresponding registered biometric information is successful.

When the information processing apparatus 10 performs account switching processing of a user being logged in, the authentication processing unit 113 performs authentication processing using registered biometric information associated with the user information of the switched user notified from the login processing unit 101. This authentication processing is performed using the corresponding registered biometric information and the biometric information transmitted from the biometric information extraction unit 107. A determination as to whether the authentication is successful or not is determined based on whether the degree of similarity between these pieces of biometric information is equal to or more than the predetermined threshold value.

Further, when the user corresponding to the newly generated user information selects the use of the already registered biometric information for the newly generated user information, the authentication processing unit 113 performs authentication processing of the corresponding registered biometric information. This authentication processing is performed using the registered biometric information and the biometric information transmitted from the biometric information extraction unit 107. A determination as to whether the authentication is successful or not is determined based on whether the degree of similarity between these pieces of biometric information is equal to or more than the predetermined threshold value.

When the authentication result of the biometric information transmitted from the biometric information extraction unit 107 is determined, the authentication processing unit 113 notifies this authentication result to the login processing unit 101. Further, the authentication processing unit 113 may display the obtained authentication result by way of the display control unit 115. When the functions or services provided to the user by the information processing apparatus 10 according to the present embodiment is provided from an external apparatus (such as a server), such authentication result may be notified to the external apparatus by way of the later-explained communication unit 117.

The display control unit 115 is realized with, for example, a CPU, a ROM, a RAM, and the like. The display control unit 115 performs display control of the display unit (not shown) such as a display arranged in the information processing apparatus 10. In response to a request given by the imaging control unit 103, the display control unit 115 displays, on the display unit, a message such as "please place biometric portion on a predetermined position." Further, in response to a request given by the biometric authentication unit 109, the display control unit 115 displays, on the display unit, a message indicating that the registration processing of biometric information is finished, a message indicating that the registration processing of biometric information has failed, or the authentication result of the biometric information. Further, in response to the request given by the login processing unit 101, the login processing unit 101 performs a series of login processing, whereby a message to be notified to the user is displayed on the display unit.

The communication unit 117 is realized with, for example, a CPU, a ROM, a RAM, and a communication apparatus. The communication unit 117 is a communication unit for controlling communication performed between the information processing apparatus 10 according to the present embodiment and another apparatus arranged outside of this information processing apparatus 10. The another apparatus in communication may be an apparatus connected to the information processing apparatus 10 via a local area network, or may be an apparatus connected to a public network such as the Internet. The communication control of the communication unit 117 is carried out between the communication unit 117 and the apparatus in communication according to a predetermined protocol previously defined.

For example, the storage unit 119 stores the user information generated by the login processing unit 101 and the registered biometric information requested to be registered by the biometric authentication unit 109. In addition to the above data, the storage unit 119 may store history information such as a history of use of the information processing apparatus 10 about each pieces of the user information and a history of authentication result. In addition to the above data, the storage unit 119 may store various parameters or progress of processing that are necessary to be stored while the information processing apparatus 10 performs certain processing, and may store various kinds of databases and so on as necessary.

This storage unit 119 can be freely read and written by each processing unit of the information processing apparatus 10 according to the present embodiment.

Examples of the functions of the information processing apparatus 10 according to the present embodiment have been hereinabove explained. Each of the above constituent elements may be made with a generally-used member and circuit, or may be made with hardware dedicated for the function of each constituent element. Alternatively, all of the functions of the constituent elements may be performed by a CPU and the like. Therefore, the used configuration may be changed as necessary in accordance with the state of art at the time when the present embodiment is carried out.

It is possible to make a computer program for realizing the functions of the above-described information processing apparatus according to the present embodiment, and the computer program can be implemented on a personal computer and the like. Further, a computer-readable recording medium storing such a computer program can be provided. Examples of recording media include a magnetic disk, an optical disk, a magneto-optical disk, and a flash memory. Further, for example, the above computer program may be distributed through a network, without using any recording medium.

<Registration Processing of User Information>

Figure 3:
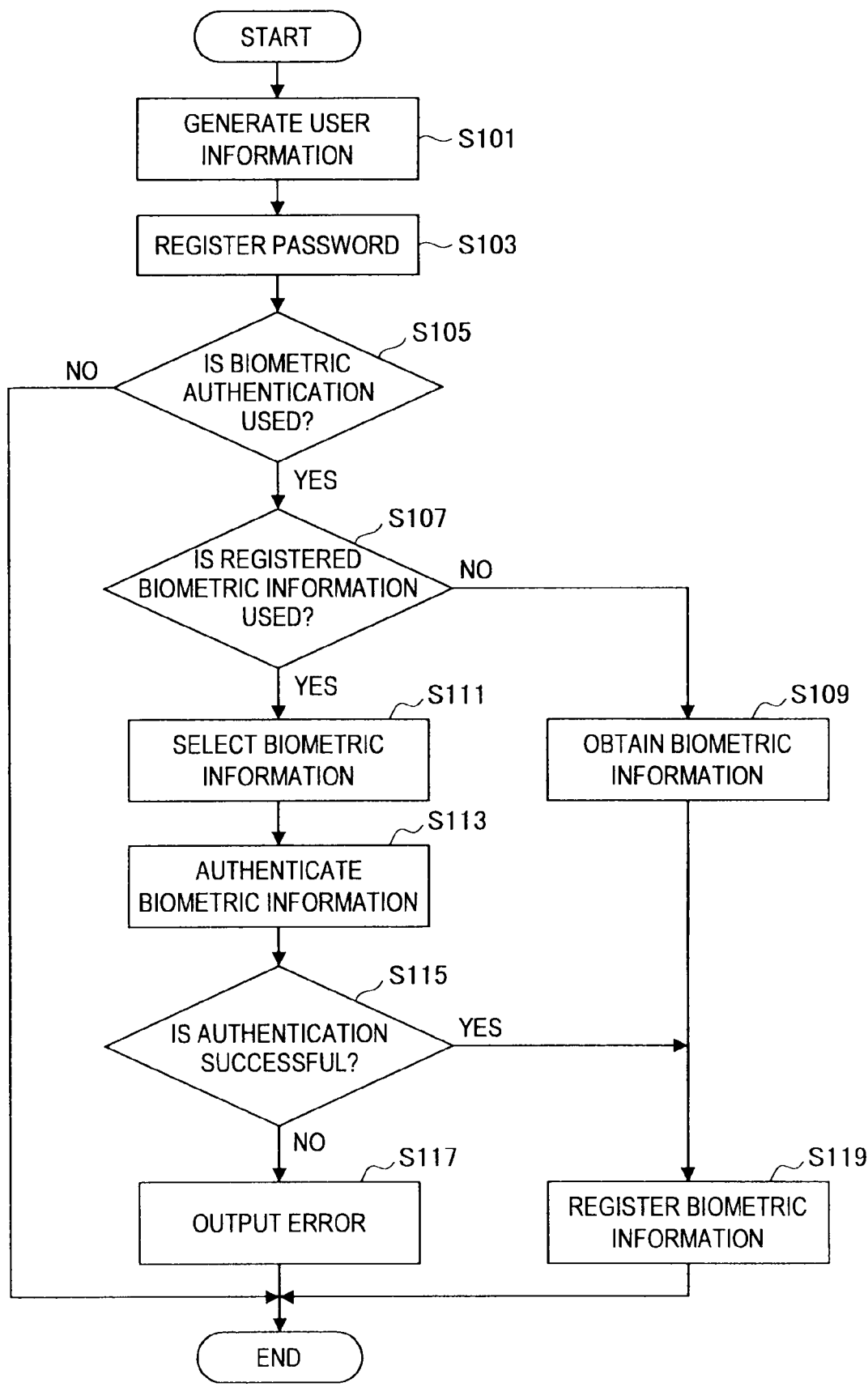
FIG. 3 is a flowchart illustrating an example of a registration method of user information carried out by the information processing apparatus of the embodiment.

Subsequently, the registration processing of user information carried out by the information processing apparatus 10 according to the present embodiment will be hereinafter explained with reference to FIG. 3. FIG. 3 is a flowchart illustrating an example of registration method of user information carried out by the information processing apparatus according to the present embodiment.

When the login processing unit 101 of the information processing apparatus 10 is requested to start processing for registering new user information by way of an input device (not shown) such as a mouse and a keyboard arranged on the information processing apparatus 10, the login processing unit 101 of the information processing apparatus 10 starts generation of user information (step S101). This user information is generated by writing predetermined information about newly generated user information in a user information management table as shown in FIG. 2, for example. For example, the login processing unit 101 generates an account ID unique to the newly generated user information and writes the account ID in the management table. In addition, the login processing unit 101 writes information representing authority given to this user information in the management table based on a specification given by the user.

Subsequently, the login processing unit 101 determines a password corresponding to this user information, and registers this password in a password field of the user information (step S103). This password may be any text string and the like set by the information processing apparatus 10, or may be a text string and the like specified by the user.

Subsequently, the login processing unit 101 causes the display control unit 115 to display, on the display unit (not shown), a message indicating that login processing is performed using biometric authentication. Thereafter, the login processing unit 101 waits for an input of selection result given by a user. When an input is given by a user, the login processing unit 101 determines information representing the selection result input by the user (step S105).

When the user input indicates that the account control using biometric authentication processing is not used, the login processing unit writes, in a field of registered biometric information of user information, that the account control using biometric authentication processing is not used, and terminates the registration processing of user information.

On the other hand, when the user input indicates that the account control using biometric authentication processing is to be used, the login processing unit 101 causes the display control unit 115 to display, on the display unit (not shown), a message asking whether already registered biometric information is used or not. Thereafter, the login processing unit 101 waits for an input of selection result given by a user. When an input is given by the user, the login processing unit 101 determines information representing the selection result input by the user (step S107).

Herein, when the user selects non-use of registered biometric information, the login processing unit 101 requests the imaging control unit 103 to start taking an image of the biometric portion, and starts obtaining the biometric information (step S109). In this case, the biometric imaging unit 105 controlled by the imaging control unit 103 takes an image of the biometric portion, and the biometric information extraction unit 107 extracts predetermined biometric information from the obtained biometric image data. When the biometric information has been obtained, the information processing apparatus 10 performs step S119 explained later.

On the other hand, when the user selects the use of the registered biometric information, the login processing unit 101 starts selection of biometric information (step S111) by, for example, displaying a list of accounts and asking the user to input a corresponding account ID. When the account ID corresponding to the registered biometric information is identified, the login processing unit 101 refers to user information of the corresponding ID.

Subsequently, the login processing unit 101 requests the imaging control unit 103 to start taking an image of the biometric portion, and starts authentication of the biometric information (step S113). In this case, the biometric imaging unit 105 controlled by the imaging control unit 103 takes an image of the biometric portion, and the biometric information extraction unit 107 extracts predetermined biometric information from the obtained biometric image data. Thereafter, the authentication processing unit 113 of the biometric authentication unit 109 carries out biometric authentication processing using the registered biometric information associated with the account ID notified by the login processing unit 101 and the extracted biometric information, and determines whether the authentication is successful or not (step S115).

When the authentication has failed, the login processing unit 101 displays, on the display unit (not shown), an error output indicating that the authentication has failed (step S117), and terminates the registration processing of user information. In this case, the login processing unit 101 may determine that the account ID, the authority, the password, and the like have been appropriately set, and adopt the generated user information as user information not relying on biometric authentication processing. Alternatively, the login processing unit 101 may discard the generated account ID and the like, and determine that no new user information has been generated.

On the other hand, in a case where new biometric information is registered without using registered biometric information, or in a case where the extracted biometric information has been successfully authenticated when registered biometric information is used, the information processing apparatus 10 performs the registration processing of biometric information (step S119).

For example, in a case where new biometric information is registered without using registered biometric information, the registration processing unit 111 of the biometric authentication unit 109 stores the extracted biometric information in a predetermined position of the storage unit 119, thereby registering the biometric information. Thereafter, the registration processing unit 111 additionally writes information representing the storage location of the registered biometric information in a field of registered biometric information of the user information corresponding to the account ID notified by the login processing unit 101. When the information has been additionally written, the registration processing unit 111 notifies the login processing unit 101 that the predetermined processing has been normally finished, and the login processing unit 101 causes the display control unit 115 to display, on the display unit, that the registration processing of user information has been appropriately finished.

When the registered biometric information is used, the authentication processing unit 113 of the biometric authentication unit 109 additionally writes information representing the storage location corresponding to the registered biometric information used for the authentication in the field of registered biometric information of the user information corresponding to the account ID notified by the login processing unit 101. When the information has been additionally written, the authentication processing unit 113 notifies the login processing unit 101 that the predetermined processing has been normally finished, and the login processing unit 101 causes the display control unit 115 to display, on the display unit, that the registration processing of user information has been appropriately finished.

As described above, the information processing apparatus 10 according to the present embodiment performs the registration processing of user information. Therefore, a plurality of user accounts can be associated with one piece of biometric information.

<Login Processing Method>

Figure 4:
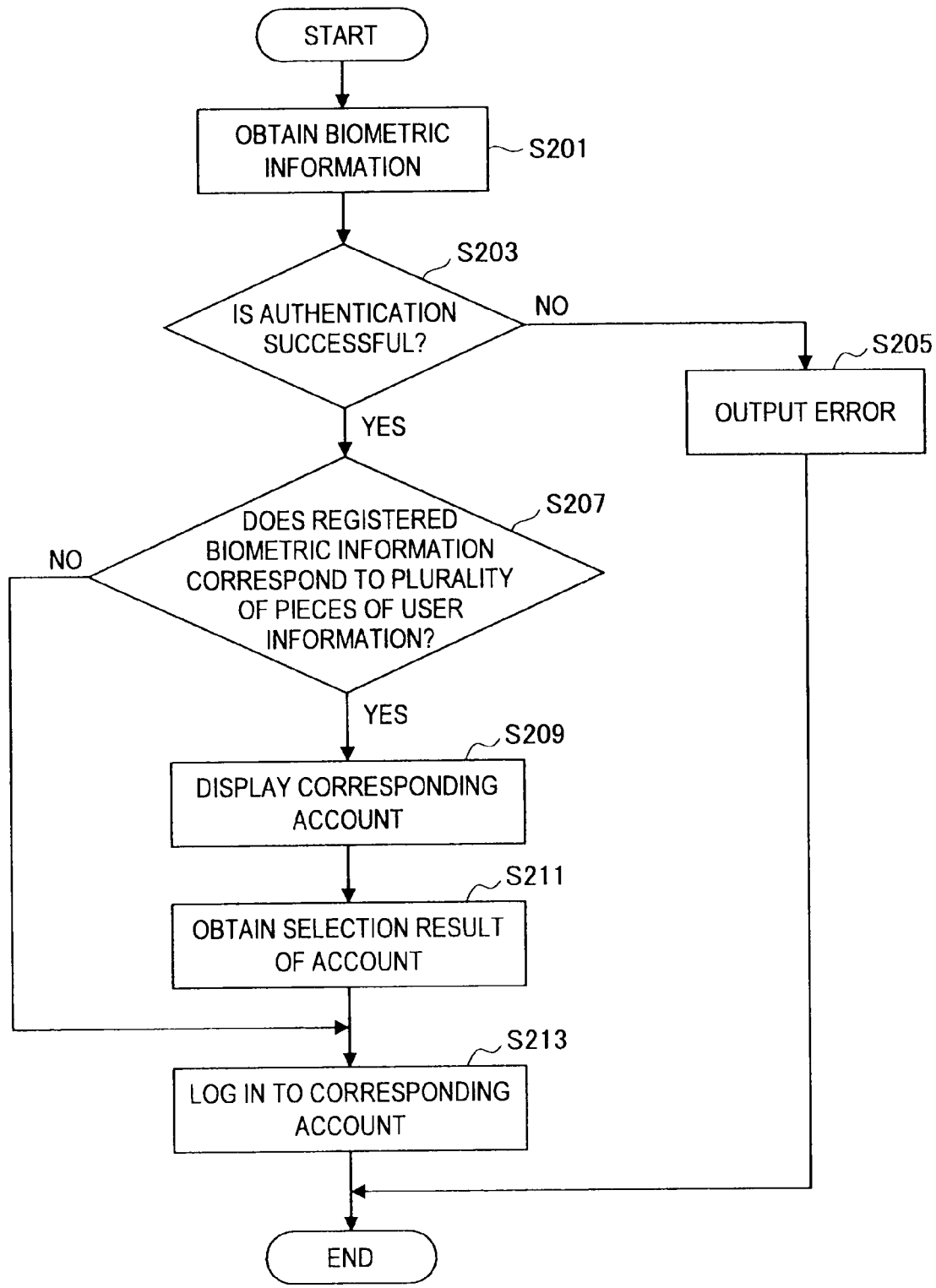
FIG. 4 is a flowchart illustrating an example of a login processing method carried out by the information processing apparatus of the embodiment.

Subsequently, the login processing method carried out by the information processing apparatus 10 according to the present embodiment will be explained in detail with reference to FIG. 4. FIG. 4 is a flowchart illustrating an example of a login processing method carried out by the information processing apparatus of the present embodiment.

In the explanation below, a login processing method using an account ID and a password will not be explained, but a login processing using biometric authentication processing will be explained in detail.

First, when biometric portion of a user is located at a predetermined position of the information processing apparatus 10, the login processing unit 101 requests the imaging control unit 103 to start taking an image of the predetermined biometric portion, and starts obtaining biometric information (step S201). In this case, the biometric imaging unit 105 controlled by the imaging control unit 103 takes an image of the biometric portion, and the biometric information extraction unit 107 extracts predetermined biometric information from the obtained biometric image data. The authentication processing unit 113 of the biometric authentication unit 109 uses all the registered biometric information to determine whether there is any registered biometric information whose degree of similarity with the extracted biometric information is equal to or more than a predetermined threshold value (step S203).

When there is no registered biometric information whose degree of similarity calculated is determined to be equal to or more than the predetermined threshold value, the authentication processing unit 113 determines that the authentication of the extracted biometric information has failed, and notifies the failed authentication to the login processing unit 101. The login processing unit 101 receives the notification of the failed authentication, and causes the display control unit 115 to display, on the display unit (not shown), an error output indicating that the authentication has failed (step S205). Then, the login processing is terminated.

On the other hand, when there is registered biometric information whose degree of similarity calculated is determined to be equal to or more than the predetermined threshold value, the authentication processing unit 113 determines that the extracted biometric information has been successfully authenticated. In this case, the authentication processing unit 113 refers to the registered user information, and identifies user information associated with the corresponding registered biometric information. Thereby, the authentication processing unit 113 determines whether the successfully authenticated registered biometric information corresponds to a plurality of pieces of user information (step S207).

When the successfully authenticated registered biometric information does not correspond to a plurality of pieces of user information (in other words, the successfully authenticated registered biometric information corresponds to only one piece of user information), the authentication processing unit 113 notifies the account ID described in the corresponding user information to the login processing unit 101. Thereafter, the login processing unit 101 uses the notified account ID to carry out step S213 explained later.

On the other hand, when the successfully authenticated registered biometric information corresponds to a plurality of pieces of user information, the authentication processing unit 113 notifies the login processing unit 101 of each of the account IDs described in the plurality of corresponding pieces of user information. Thereafter, the login processing unit 101 uses the plurality of notified account IDs to refer to the user information, and causes the display control unit 115 to display, on the display unit (not shown), a list of accounts available for login (step S209).

When the user sees the list of accounts available for login, the user operates an input device (not shown) such as a mouse, a keyboard and a stylus to select an account used for login. Thus, information representing the selection result of the account is generated, and the login processing unit 101 obtains the generated information representing the selection result of the account (step S211). The login processing unit 101 uses the obtained information representing the selection result of the account as user specification information for specifying user information, and uses the corresponding user information to carry out step S213 explained later.

When the user information used for the login processing is identified, the login processing unit 101 carries out the login processing using the corresponding account while referring to the corresponding user information (step S213). Therefore, the user of the information processing apparatus 10 can log in to any one of the plurality of accounts using one piece of biometric information.

<Switching Method of Account>

Figure 5:
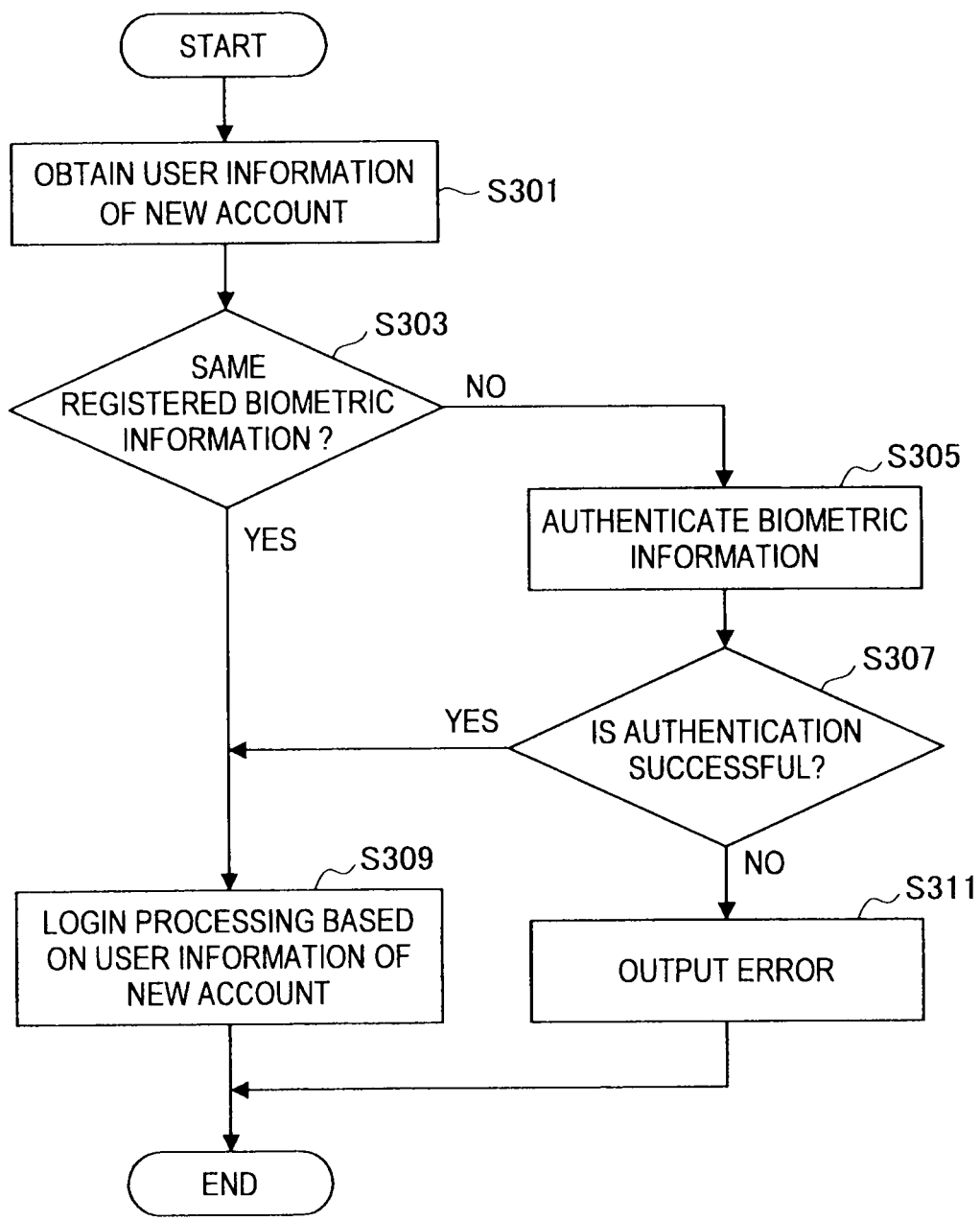
FIG. 5 is a flowchart illustrating an example of a switching processing of an account carried out by the information processing apparatus of the embodiment.

Subsequently, a switching method of an account carried out by the information processing apparatus 10 according to the present embodiment will be explained in detail with reference to FIG. 5. FIG. 5 is a flowchart illustrating an example of a switching processing of an account carried out by the information processing apparatus of the present embodiment.

The switching method of the account explained below is performed in a case where the current account being logged in is logged in by way of the login processing using biometric authentication processing and where a new account to which the current account is switched is specified as an account for performing the login processing using biometric authentication processing. In other words, the below-explained switching method of the account is not performed in a case where at least any one of the current account and the new account is specified as user information without any biometric authentication processing.

When the user who logs in to the information processing apparatus 10 performs operation to request switching of the account, the login processing unit 101 obtains information for identifying user information (such as account ID) of the new account (step S301). The login processing unit 101 refers to the user information of the new account using the obtained information, and determines whether registered biometric information associated with the user information currently being logged in is the same as registered biometric information associated with the user information of the new account (step S303).

When the registered biometric information associated with the user information of the new account is determined to be the same as the registered biometric information associated with the user information of the account currently being logged in, the login processing unit 101 carries out step S309 explained below.

On the other hand, when the registered biometric information associated with the user information of the new account is determined not to be the same as the registered biometric information associated with the user information of the account currently being logged in, the login processing unit 101 requests the imaging control unit 103 to start taking an image of the biometric portion, and starts authentication of the biometric information (step S305). In this way, the authentication processing unit 113 determines whether the authentication has succeeded or not (step S307).

When the authentication processing unit 113 determines that the authentication has been successful, the authentication processing unit 113 notifies information indicating that the authentication has been successful to the login processing unit 101. When the login processing unit 101 obtains the notification indicating that the authentication has been successful, the login processing unit 101 carries out step S309 explained below. On the other hand, the authentication processing unit 113 determines that the authentication has failed, the authentication processing unit 113 performs step S311 explained later.

When the registered biometric information corresponding to the user information of the new account is determined to be the same as that of the user information of the account currently being logged in, or when the authentication processing of the user information of the new account has been successful, the login processing unit 101 carries out the login processing based on the user information of the new account (step S309). Thus, the user can log in to the information processing apparatus 10 again using the specified user account.

On the other hand, when the login processing unit 101 receives a notification of failed authentication, the login processing unit 101 causes the display control unit 115 to display, on the display unit (not shown), the error output indicating that the authentication has failed (step S311), and terminates the switching processing of the account.

Therefore, the user of the information processing apparatus 10 can switch the account in a simpler manner, and the convenience for the user can be improved.

<First Modification>

Figure 7:
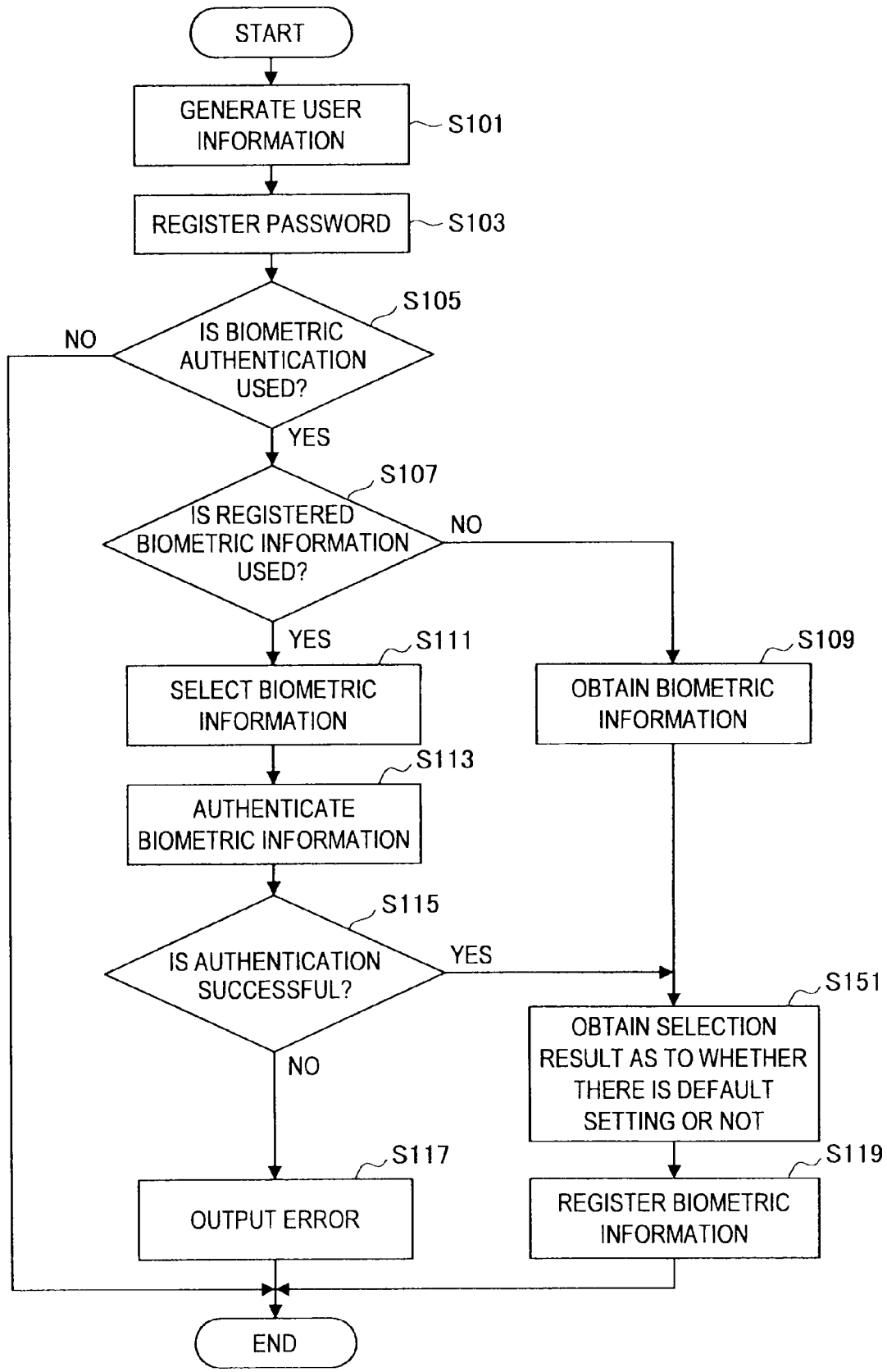
FIG. 7 is a flowchart illustrating an example of a registration method of user information carried out by the information processing apparatus of the modification.
Figure 8:
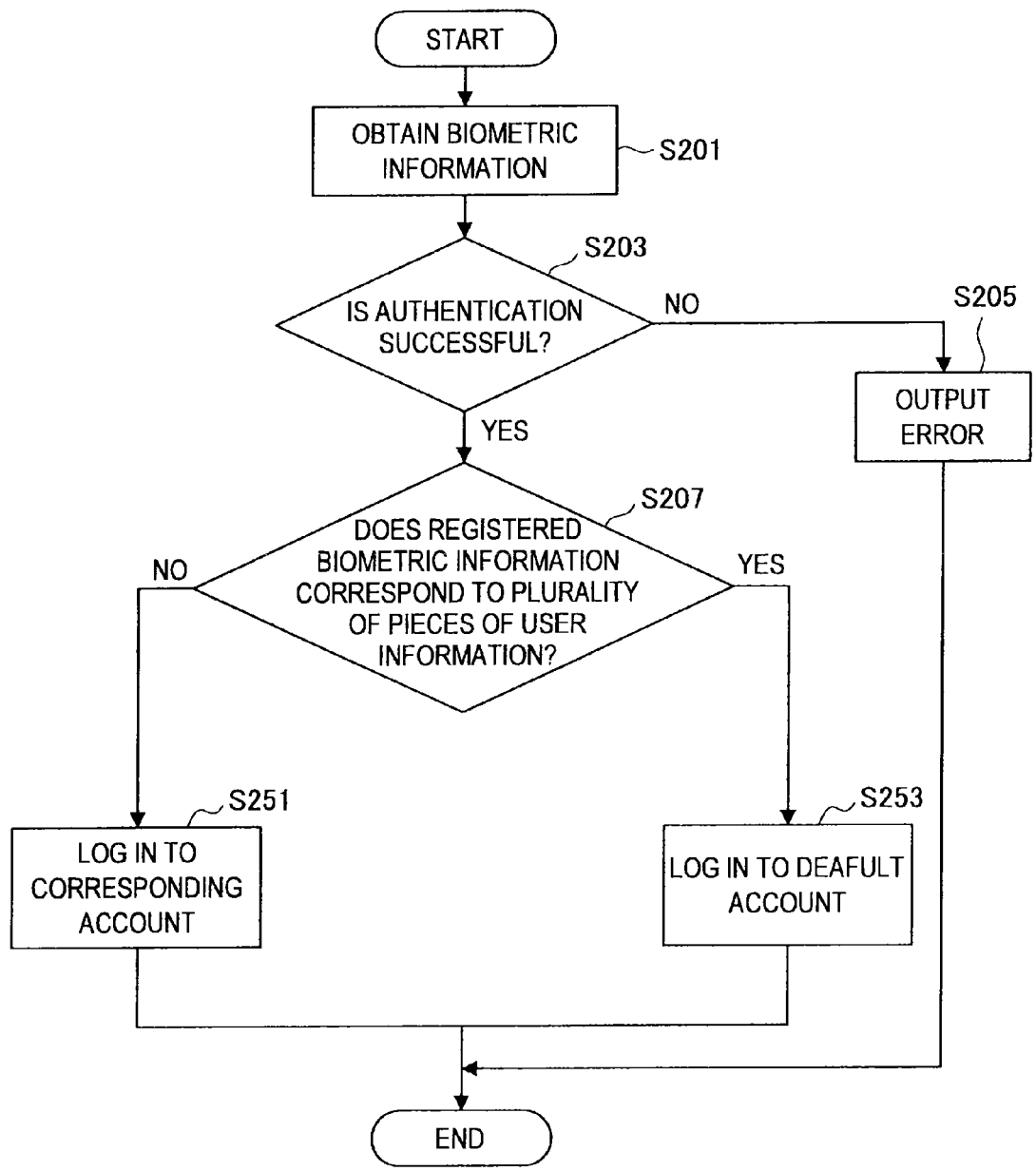
FIG. 8 is a flowchart illustrating an example of a login processing method carried out by the information processing apparatus of the modification.

Subsequently, a first modification of the information processing apparatus 10 according to the present embodiment will be explained in detail with reference to FIGS. 6 to 8. In the explanation below, differences from the information processing apparatus 10 according to the present embodiment will be mainly explained. The detailed explanation about the features other than the differences are omitted.

In the information processing apparatus 10 according to the first embodiment, when a plurality of accounts are associated with successfully authenticated registered biometric information, a list of accounts available for login is displayed to allow the user to make a selection. However, the information processing apparatus 10 according to the present modification may perform the following processings instead of the above processings.

More specifically, in the information processing apparatus 10 according to the present modification, a plurality of pieces of user information associated with one piece of registered biometric information are attached with information for specifying user information preferentially used during the login processing.

Examples of information for specifying user information preferentially used during the login processing include information for specifying default user information used during the login processing, information for specifying the order of priority of the plurality of pieces of user information, and conditions for determining the order of priority.

For example, as shown in FIG. 6, the default user information can be realized by arranging a field of user information for containing information representing whether the user information is designated as default or not and adding a predetermined data code and the like to the user information designated as default. Examples of conditions for determining the order of priority include magnitudes of authorities given to accounts and frequencies of uses of accounts by means of a history of use of accounts.

Such information may be registered as user information as follows when new user information is registered. The login processing unit 101 displays a predetermined message on the display unit and the like, and allows the user to specify predetermined information.

The registration processing of user information and the login processing according to the present modification will be hereinafter explained in detail with reference to the flowchart.

[Registration Processing of User Information]

First, the registration processing of user information carried out by the information processing apparatus 10 according to the present modification will be explained in detail with reference to FIG. 7. In the explanation, a case where default user information is specified will be explained in detail as an example. FIG. 7 is a flowchart illustrating an example of the registration method of user information carried out by the information processing apparatus according to the present modification.

When the login processing unit 101 of the information processing apparatus 10 receives a request for starting processing for registering new user information by way of the input device (not shown) such as a mouse and a keyboard arranged on the information processing apparatus 10, the login processing unit 101 starts generation of user information (step S101).

Subsequently, the login processing unit 101 determines a password corresponding to this user information, and registers the password in a field of password of the corresponding user information (step S103). This password may be any text string and the like set by the information processing apparatus 10, or may be a text string and the like specified by the user.

Subsequently, the login processing unit 101 causes the display control unit 115 to display, on the display unit (not shown), a message for asking whether login processing using biometric authentication is performed or not. Thereafter, the login processing unit 101 waits for an input of selection result given by a user. When an input is given by a user, the login processing unit 101 determines information representing the selection result input by the user (step S105).

When the user input indicates that the account control using biometric authentication processing is not used, the login processing unit writes, in a field of registered biometric information of user information, that the account control using biometric authentication processing is not used, and terminates the registration processing of user information.

On the other hand, when the user input indicates that the account control using biometric authentication processing is to be used, the login processing unit 101 causes the display control unit 115 to display, on the display unit (not shown), a message asking whether already registered biometric information is used or not. Thereafter, the login processing unit 101 waits for an input of selection result given by a user. When an input is given by the user, the login processing unit 101 determines information representing the selection result input by the user (step S107).

Herein, when the user selects non-use of registered biometric information, the login processing unit 101 requests the imaging control unit 103 to start taking an image of the biometric portion, and starts obtaining the biometric information (step S109). In this case, the biometric imaging unit 105 controlled by the imaging control unit 103 takes an image of the biometric portion, and the biometric information extraction unit 107 extracts predetermined biometric information from the obtained biometric image data. When the biometric information has been obtained, the information processing apparatus 10 performs step S151 explained later.

On the other hand, when the user selects the use of the registered biometric information, the login processing unit 101 starts selection of biometric information (step S111) by, for example, displaying a list of accounts and asking the user to input a corresponding account ID. When the account ID corresponding to the registered biometric information is identified, the login processing unit 101 refers to user information of the corresponding account ID.

Subsequently, the login processing unit 101 requests the imaging control unit 103 to start taking an image of the biometric portion, and starts authentication of the biometric information (step S113). In this case, the biometric imaging unit 105 controlled by the imaging control unit 103 takes an image of the biometric portion, and the biometric information extraction unit 107 extracts predetermined biometric information from the obtained biometric image data. Thereafter, the authentication processing unit 113 of the biometric authentication unit 109 carries out biometric authentication processing using the registered biometric information associated with the account ID notified by the login processing unit 101 and the extracted biometric information, and determines whether the authentication is successful or not (step S115).

When the authentication has failed, the login processing unit 101 displays, on the display unit (not shown), an error output indicating that the authentication has failed (step S117), and terminates the registration processing of user information.

On the other hand, in a case where new biometric information is registered without using registered biometric information, or in a case where the extracted biometric information has been successfully authenticated when registered biometric information is used, the information processing apparatus 10 obtains the selection result as to whether there is default setting or not (step S151). When the user selects a selection result indicating designation of default user information, the login processing unit 101 additionally writes the data code and the like as shown in FIG. 6 to the generated user information. Thereafter, the login processing unit 101 performs the registration processing of the biometric information (step S119).

As described above, the information processing apparatus 10 according to the present embodiment performs the registration processing of user information. Therefore, a plurality of user accounts can be associated with one piece of biometric information.

[Login Processing Method]

Subsequently, the login processing method carried out by the information processing apparatus 10 according to the present modification will be explained in detail with reference to FIG. 8. In the explanation, a case where default user information is specified will be explained in detail as an example. FIG. 8 is a flowchart illustrating an example of login processing method carried out by the information processing apparatus according to the present modification.

First, when biometric portion of a user is located at a predetermined position of the information processing apparatus 10, the login processing unit 101 requests the imaging control unit 103 to start taking an image of the predetermined biometric portion, and starts obtaining biometric information (step S201). In this case, the biometric imaging unit 105 controlled by the imaging control unit 103 takes an image of the biometric portion, and the biometric information extraction unit 107 extracts predetermined biometric information from the obtained biometric image data. The authentication processing unit 113 of the biometric authentication unit 109 uses all the registered biometric information to determine whether there is any registered biometric information whose degree of similarity with the extracted biometric information is equal to or more than a predetermined threshold value (step S203).

When there is no registered biometric information whose degree of similarity calculated is determined to be equal to or more than the predetermined threshold value, the authentication processing unit 113 determines that the authentication of the extracted biometric information has failed, and notifies the failed authentication to the login processing unit 101. The login processing unit 101 receives the notification of the failed authentication, and causes the display control unit 115 to display, on the display unit (not shown), an error output indicating that the authentication has failed (step S205). Then, the login processing is terminated.

On the other hand, when there is registered biometric information whose degree of similarity calculated is determined to be equal to or more than the predetermined threshold value, the authentication processing unit 113 determines that the extracted biometric information has been successfully authenticated. In this case, the authentication processing unit 113 refers to the registered user information, and identifies user information associated with the corresponding registered biometric information. Thereby, the authentication processing unit 113 determines whether the successfully authenticated registered biometric information corresponds to a plurality of pieces of user information (step S207).

When the successfully authenticated registered biometric information does not correspond to a plurality of pieces of user information (in other words, the successfully authenticated registered biometric information corresponds to only one piece of user information), the authentication processing unit 113 notifies the account ID described in the corresponding user information to the login processing unit 101. Thereafter, the login processing unit 101 uses the notified account ID to refer to the user information, and uses the corresponding account to carry out the login processing (step S251).

On the other hand, when the successfully authenticated registered biometric information corresponds to a plurality of pieces of user information, the authentication processing unit 113 notifies the login processing unit 101 of each of the account IDs described in the plurality of corresponding pieces of user information. Thereafter, the login processing unit 101 uses the plurality of notified account IDs to refer to the user information, and checks the description about the default setting of the user information. Even though a plurality of pieces of user information are associated with one piece of registered biometric information, there is only one default user information. Accordingly, the login processing unit 101 identifies the user information set as the default, and uses the identified user information to carry out the login processing using the default account (step S253).

Therefore, even though a plurality of pieces of user information are associated with one piece of registered biometric information, the user can automatically log in to the frequently-used account by just scanning the biometric portion. As a result, in the information processing apparatus 10 according to the present modification, the convenience for the user can be improved.

<Second Modification>

Figure 10:
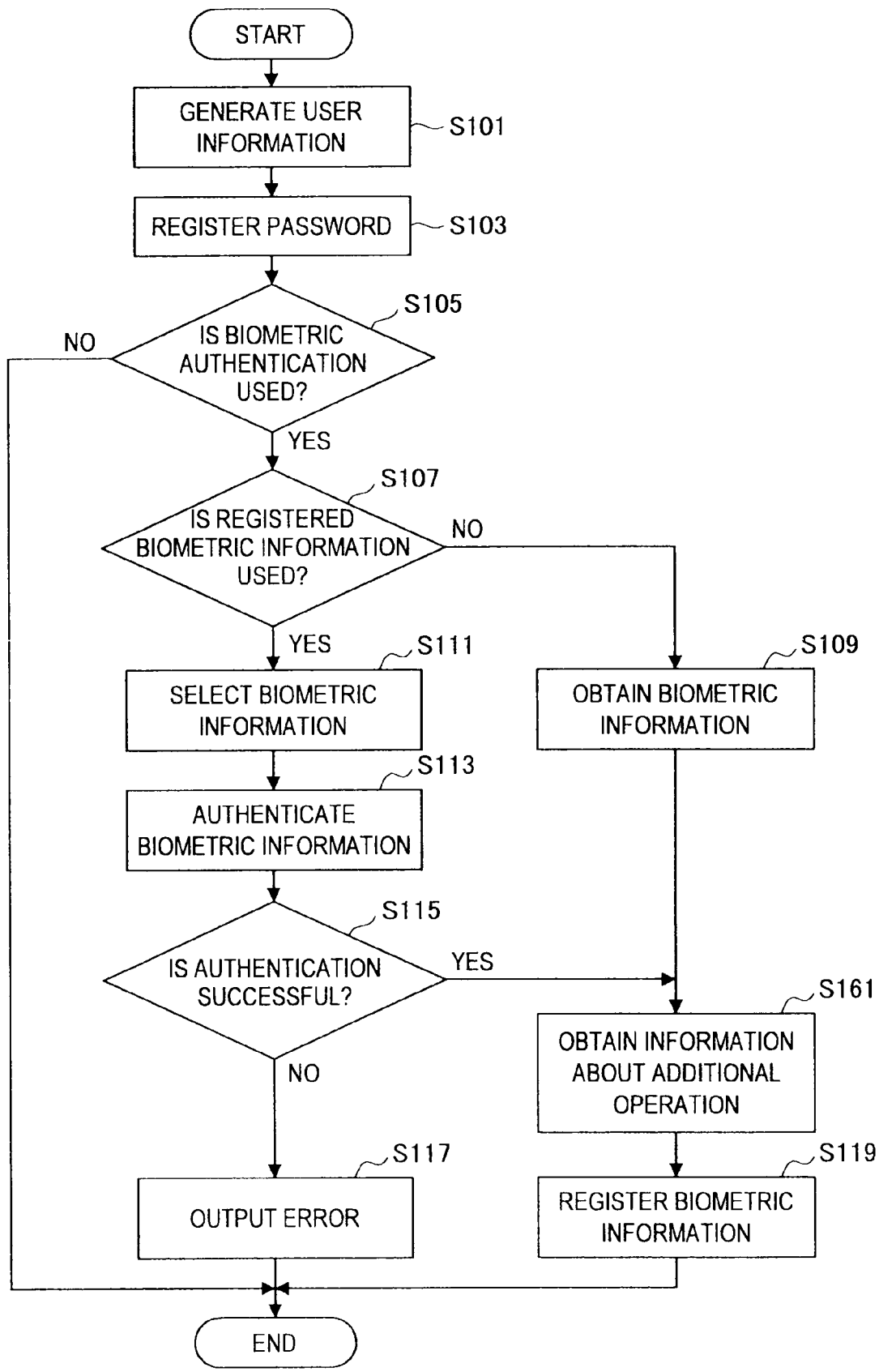
FIG. 10 is a flowchart illustrating an example of a registration method of user information carried out by the information processing apparatus of the modification.
Figure 11:
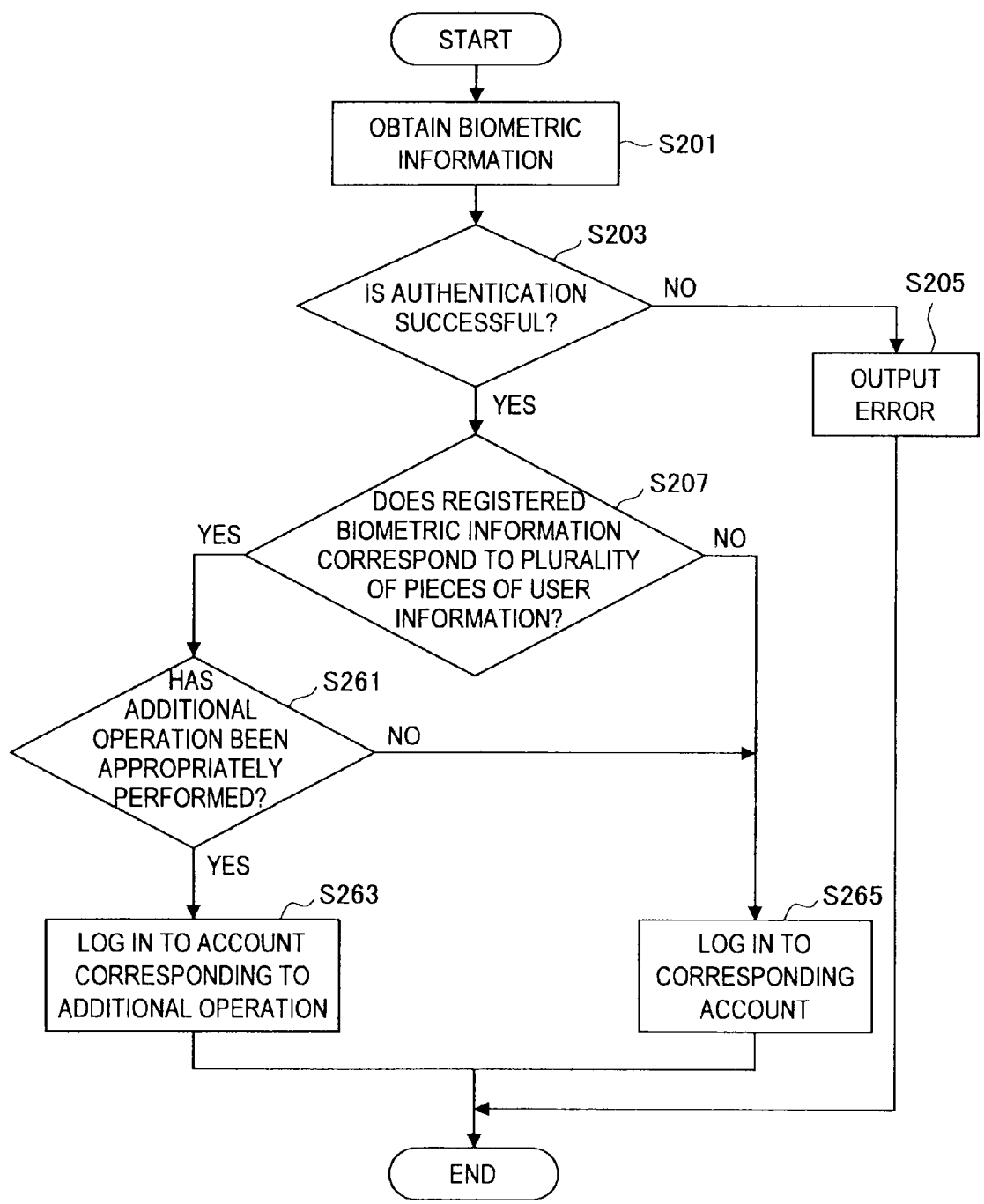
FIG. 11 is a flowchart illustrating an example of a login processing method carried out by the information processing apparatus of the modification.

Subsequently, a second modification of the information processing apparatus 10 according to the present embodiment will be explained in detail with reference to FIGS. 9 to 11. In the explanation below, differences from the information processing apparatus 10 according to the present embodiment will be mainly explained. The detailed explanation about the features other than the differences are omitted.

In the information processing apparatus 10 according to the first embodiment, when a plurality of accounts are associated with successfully authenticated registered biometric information, a list of accounts available for login is displayed to allow the user to make a selection. However, the information processing apparatus 10 according to the present modification may perform the following processings instead of the above processings.

More specifically, in the information processing apparatus 10 according to the present modification, a plurality of pieces of user information associated with one piece of registered biometric information are attached with additional operation information as to operation additionally performed by a user when the user logs in using predetermined user information.

Examples of operation additionally performed by a user (which may be hereinafter referred to as additional operation) include operation such as pressing a predetermined key or portion of the input device such as a keyboard, a mouse, and a button arranged in the present modification. When such additional operation is performed, the login processing unit 101 receives not only information about authentication result of biometric information but also information generated within the information processing apparatus 10. The login processing unit 101 uses information arising from such additional operation as user specification information, whereby the login processing unit 101 can select user information.

In the example shown in FIG. 9, user information having an account ID "AAAA" is attached with additional operation information indicating "press F1 key on a keyboard arranged on the information processing apparatus 10". When the user information identified by the authentication result provided by the biometric authentication unit 109 is the user information corresponding to the account ID "AAAA", the login processing unit 101 refers to the user information and checks whether there is any additional operation information or not. When there is additional operation information, the login processing unit 101 reviews the content of the additional operation information, and determines whether information generated by such additional operation has been notified or not. Thus, the login processing unit 101 can identify user information used for the login processing from among the plurality of pieces of user information associated with one piece of registered biometric information.

Such additional operation information may be registered as user information as follows when new user information is registered. The login processing unit 101 displays a predetermined message on the display unit and the like, and allows the user to specify additional operation.

The registration processing of user information and the login processing according to the present modification will be hereinafter explained in detail with reference to the flowchart.

[Registration Processing of User Information]

First, the registration processing of user information carried out by the information processing apparatus 10 according to the present modification will be explained in detail with reference to FIG. 10. FIG. 10 is a flowchart illustrating an example of the registration method of user information carried out by the information processing apparatus according to the present modification.

When the login processing unit 101 of the information processing apparatus 10 receives a request for starting processing for registering new user information by way of the input device (not shown) such as a mouse and a keyboard arranged on the information processing apparatus 10, the login processing unit 101 starts generation of user information (step S101).

Subsequently, the login processing unit 101 determines a password corresponding to this user information, and registers the password in a field of password of the corresponding user information (step S103). This password may be any text string and the like set by the information processing apparatus 10, or may be a text string and the like specified by the user.

Subsequently, the login processing unit 101 causes the display control unit 115 to display, on the display unit (not shown), a message for asking whether login processing using biometric authentication is performed or not. Thereafter, the login processing unit 101 waits for an input of selection result given by a user. When an input is given by a user, the login processing unit 101 determines information representing the selection result input by the user (step S105).

When the user input indicates that the account control using biometric authentication processing is not used, the login processing unit writes, in a field of registered biometric information of user information, that the account control using biometric authentication processing is not used, and terminates the registration processing of user information.

On the other hand, when the user input indicates that the account control using biometric authentication processing is to be used, the login processing unit 101 causes the display control unit 115 to display, on the display unit (not shown), a message asking whether already registered biometric information is used or not. Thereafter, the login processing unit 101 waits for an input of selection result given by a user. When an input is given by the user, the login processing unit 101 determines information representing the selection result input by the user (step S107).

Herein, when the user selects non-use of registered biometric information, the login processing unit 101 requests the imaging control unit 103 to start taking an image of the biometric portion, and starts obtaining the biometric information (step S109). In this case, the biometric imaging unit 105 controlled by the imaging control unit 103 takes an image of the biometric portion, and the biometric information extraction unit 107 extracts predetermined biometric information from the obtained biometric image data. When the biometric information has been obtained, the information processing apparatus 10 performs step S161 explained later.

On the other hand, when the user selects the use of the registered biometric information, the login processing unit 101 starts selection of biometric information (step S111) by, for example, displaying a list of accounts and asking the user to input a corresponding account ID. When the account ID corresponding to the registered biometric information is identified, the login processing unit 101 refers to user information of the corresponding account ID.

Subsequently, the login processing unit 101 requests the imaging control unit 103 to start taking an image of the biometric portion, and starts authentication of the biometric information (step S113). In this case, the biometric imaging unit 105 controlled by the imaging control unit 103 takes an image of the biometric portion, and the biometric information extraction unit 107 extracts predetermined biometric information from the obtained biometric image data. Thereafter, the authentication processing unit 113 of the biometric authentication unit 109 carries out biometric authentication processing using the registered biometric information associated with the account ID notified by the login processing unit 101 and the extracted biometric information, and determines whether the authentication is successful or not (step S115).

When the authentication has failed, the login processing unit 101 displays, on the display unit (not shown), an error output indicating that the authentication has failed (step S117), and terminates the registration processing of user information.

On the other hand, in a case where new biometric information is registered without using registered biometric information, or in a case where the extracted biometric information has been successfully authenticated when registered biometric information is used, the information processing apparatus 10 obtains information about additional operation (step S161). When the user specifies additional operation, the login processing unit 101 additionally writes the data code and the like as shown in FIG. 9 in the generated user information. Thereafter, the login processing unit 101 performs the registration processing of the biometric information (step S119).

As described above, the information processing apparatus 10 according to the present embodiment performs the registration processing of user information. Therefore, a plurality of user accounts can be associated with one piece of biometric information.

[Login Processing Method]

Subsequently, the login processing method carried out by the information processing apparatus 10 according to the present modification will be explained in detail with reference to FIG. 11. FIG. 11 is a flowchart illustrating an example of the login processing method carried out by the information processing apparatus according to the present modification.

First, when a biometric portion of a user is located at a predetermined position of the information processing apparatus 10, the login processing unit 101 requests the imaging control unit 103 to start taking an image of the predetermined biometric portion, and starts obtaining biometric information (step S201). In this case, the biometric imaging unit 105 controlled by the imaging control unit 103 takes an image of the biometric portion, and the biometric information extraction unit 107 extracts predetermined biometric information from the obtained biometric image data. The authentication processing unit 113 of the biometric authentication unit 109 uses all the registered biometric information to determine whether there is any registered biometric information whose degree of similarity with the extracted biometric information is equal to or more than a predetermined threshold value (step S203).

When there is no registered biometric information whose degree of similarity calculated is determined to be equal to or more than the predetermined threshold value, the authentication processing unit 113 determines that the authentication of the extracted biometric information has failed, and notifies the failed authentication to the login processing unit 101. The login processing unit 101 receives the notification of the failed authentication, and causes the display control unit 115 to display, on the display unit (not shown), an error output indicating that the authentication has failed (step S205). Then, the login processing is terminated.

On the other hand, when there is registered biometric information whose degree of similarity calculated is determined to be equal to or more than the predetermined threshold value, the authentication processing unit 113 determines that the extracted biometric information has been successfully authenticated. In this case, the authentication processing unit 113 refers to the registered user information, and identifies user information associated with the corresponding registered biometric information. Thereby, the authentication processing unit 113 determines whether the successfully authenticated registered biometric information corresponds to a plurality of pieces of user information (step S207).

When the successfully authenticated registered biometric information does not correspond to a plurality of pieces of user information (in other words, the successfully authenticated registered biometric information corresponds to only one piece of user information), the authentication processing unit 113 notifies the account ID described in the corresponding user information to the login processing unit 101. Thereafter, the login processing unit 101 carries out step S265 explained later.

On the other hand, when the successfully authenticated registered biometric information corresponds to a plurality of pieces of user information, the authentication processing unit 113 notifies the login processing unit 101 of each of the account IDs described in the plurality of corresponding pieces of user information. Thereafter, the login processing unit 101 refers to the corresponding user information, and checks the additional operation information. Further, the login processing unit 101 determines whether information arising from the additional information has been notified or not when the biometric information is obtained. Thereby, the login processing unit 101 can determine whether the additional operation has been appropriately performed or not (step S261).

When the additional operation is determined to have been appropriately performed, the login processing unit 101 refers to user information for the case where the additional operation is performed, and uses such user information to carry out the login processing using the default account (step S263).

On the other hand, when the additional operation is determined not to have been appropriately performed, or when the successfully authenticated registered biometric information is determined not to correspond to a plurality of pieces of user information, the login processing unit 101 refers to the user information, and carries out the login processing using the corresponding account (step S265).

Therefore, even though a plurality of pieces of user information are associated with one piece of registered biometric information, the user can easily log in to the particular account by just scanning the biometric portion while performing the predetermined additional operation. As a result, in the information processing apparatus 10 according to the present modification, the convenience for the user can be improved.

<Third Modification>

Figure 13:
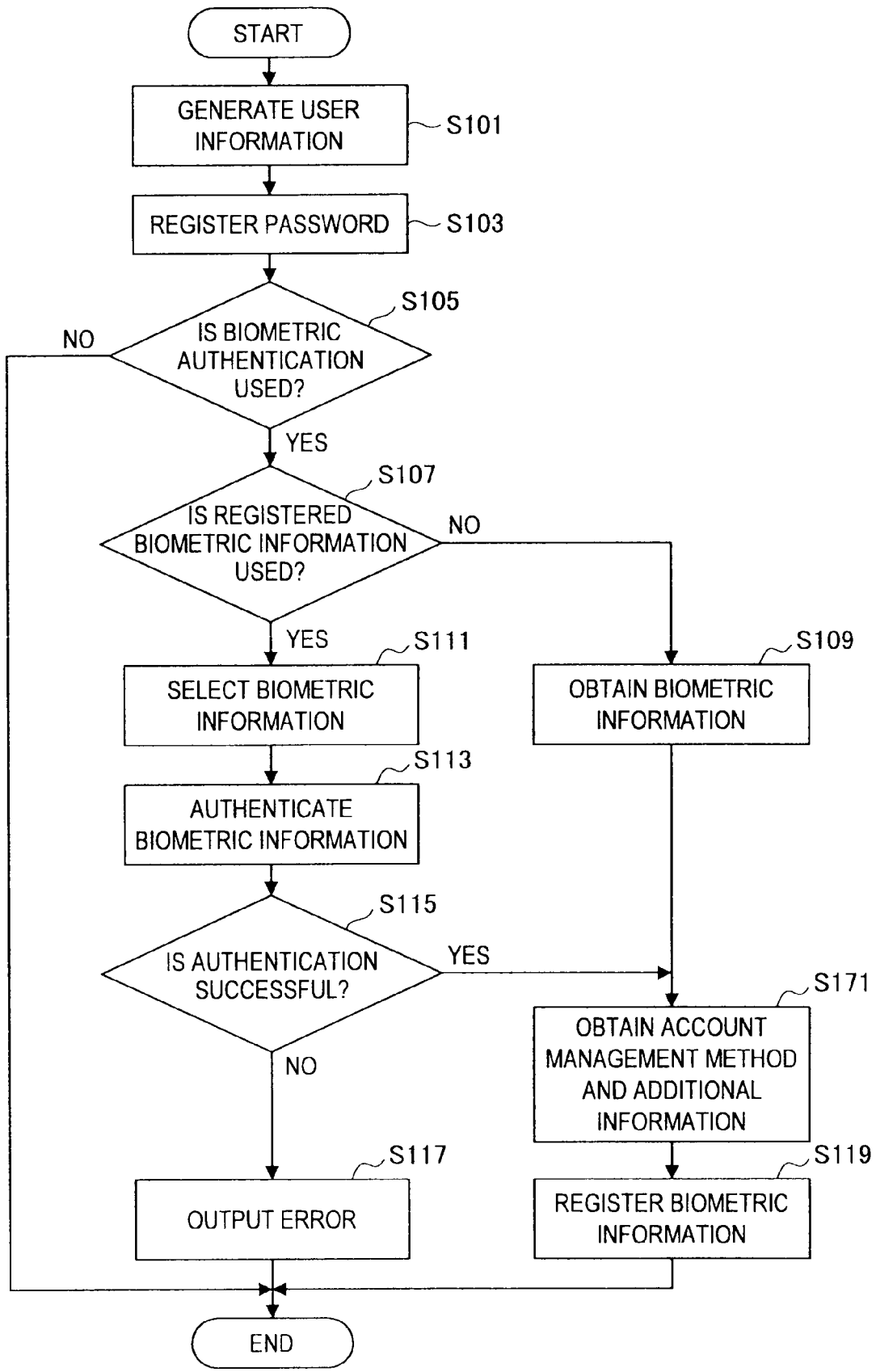
FIG. 13 is a flowchart illustrating an example of a registration method of user information carried out by the information processing apparatus of the modification.
Figure 14:
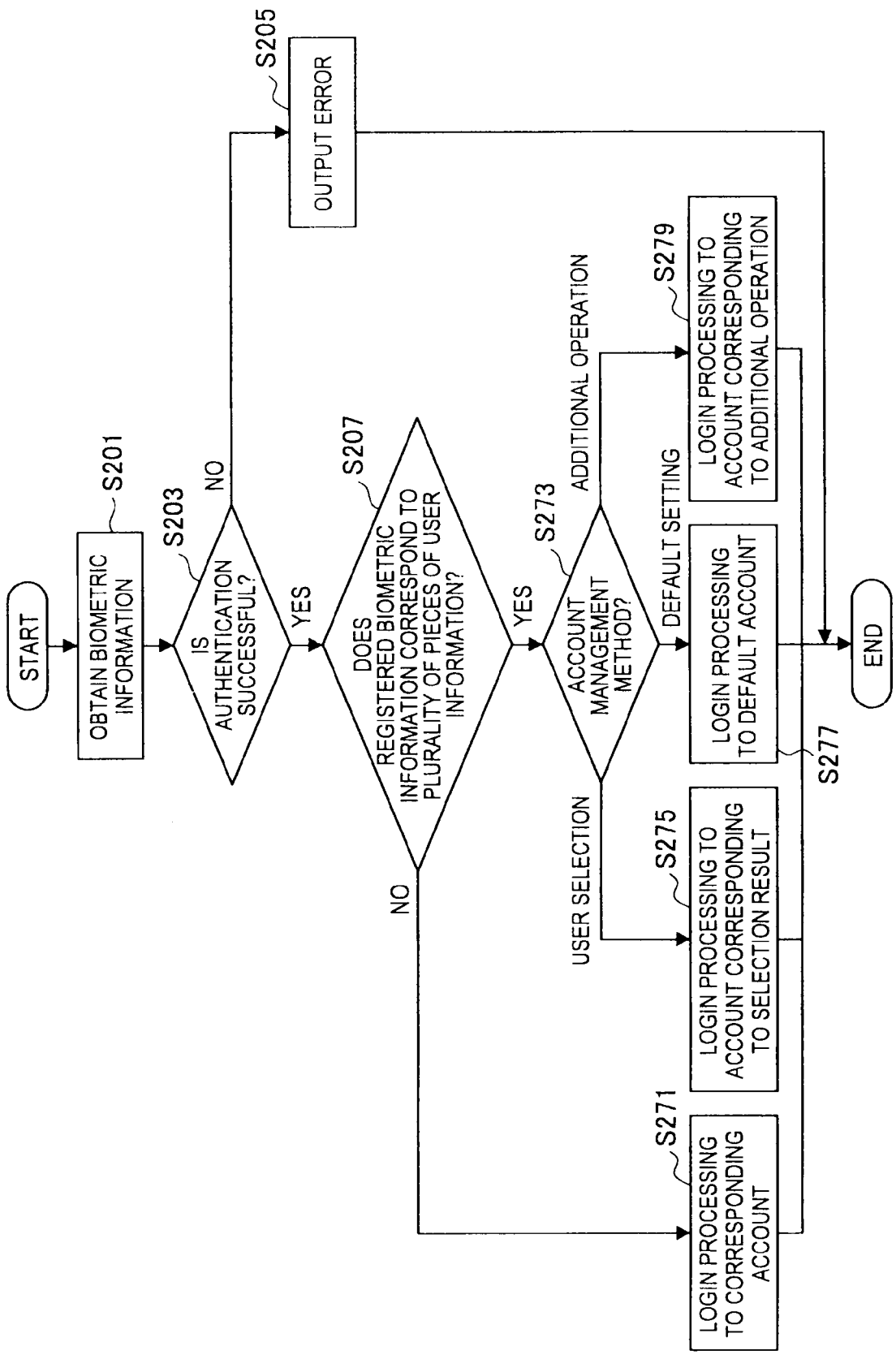
FIG. 14 is a flowchart illustrating an example of a login processing method carried out by the information processing apparatus of the modification.

Subsequently, a third modification of the information processing apparatus 10 according to the present embodiment will be explained in detail with reference to FIGS. 12 to 14. In the explanation below, differences from the information processing apparatus 10 according to the present embodiment will be mainly explained. The detailed explanation about the features other than the differences are omitted.

In the first embodiment, the first modification, and the second modification of the present invention explained above, the login processing is performed according to the management method of one type of account. In the information processing apparatus 10 according to the present modification, the user is allowed to select one of the three types of account management methods as explained above during the login processing when a user generates new user information.

Even in such a case, information for identifying an account management method is attached as user information as shown in FIG. 12, for example. This additional information corresponding to the account management method is additionally written in each piece of user information.

For example, the user information of the account ID "AAAA" as shown in FIG. 12 is user information attached with an administrator privilege, and an account management method for using, as user specification information, information as to whether additional operation has been performed or not during the login processing is selected. Further, the content of the additional operation information is written in the additional information field of this user information as additional information associated with the account management method.

On the other hand, the user information of the account ID "BBBB" as shown in FIG. 12 is user information attached with an ordinary user authority, and an account management method for using, as user specification information, information as to whether the user information is designated as default or not is selected. Further, a data code and the like indicating that the user information is designated as default is written in the additional information field of this user information as additional information associated with the account management method.

Such account management method and the additional information may be registered as user information as follows when new user information is registered. The login processing unit 101 displays a predetermined message on the display unit and the like, and allows the user to specify the message and the like.

The registration processing of user information and the login processing according to the present modification will be hereinafter explained in detail with reference to the flowchart.

[Registration Processing of User Information]

First, the registration processing of user information carried out by the information processing apparatus 10 according to the present modification will be explained in detail with reference to FIG. 13. FIG. 13 is a flowchart illustrating an example of the registration method of user information carried out by the information processing apparatus according to the present modification.

When the login processing unit 101 of the information processing apparatus 10 receives a request for starting processing for registering new user information by way of the input device (not shown) such as a mouse and a keyboard arranged on the information processing apparatus 10, the login processing unit 101 starts generation of user information (step S101).

Subsequently, the login processing unit 101 determines a password corresponding to this user information, and registers the password in a field of password of the corresponding user information (step S103). This password may be any text string and the like set by the information processing apparatus 10, or may be a text string and the like specified by the user.

Subsequently, the login processing unit 101 causes the display control unit 115 to display, on the display unit (not shown), a message for asking whether login processing using biometric authentication is performed or not. Thereafter, the login processing unit 101 waits for an input of selection result given by a user. When an input is given by a user, the login processing unit 101 determines information representing the selection result input by the user (step S105).

When the user input indicates that the account control using biometric authentication processing is not used, the login processing unit writes, in a field of registered biometric information of user information, that the account control using biometric authentication processing is not used, and terminates the registration processing of user information.

On the other hand, when the user input indicates that the account control using biometric authentication processing is to be used, the login processing unit 101 causes the display control unit 115 to display, on the display unit (not shown), a message asking whether already registered biometric information is used or not. Thereafter, the login processing unit 101 waits for an input of selection result given by a user. When an input is given by the user, the login processing unit 101 determines information representing the selection result input by the user (step S107).

Herein, when the user selects non-use of registered biometric information, the login processing unit 101 requests the imaging control unit 103 to start taking an image of the biometric portion, and starts obtaining the biometric information (step S109). In this case, the biometric imaging unit 105 controlled by the imaging control unit 103 takes an image of the biometric portion, and the biometric information extraction unit 107 extracts predetermined biometric information from the obtained biometric image data. When the biometric information has been obtained, the information processing apparatus 10 performs step S171 explained later.

On the other hand, when the user selects the use of the registered biometric information, the login processing unit 101 starts selection of biometric information (step S111) by, for example, displaying a list of accounts and asking the user to input a corresponding account ID. When the account ID corresponding to the registered biometric information is identified, the login processing unit 101 refers to user information of the corresponding ID.

Subsequently, the login processing unit 101 requests the imaging control unit 103 to start taking an image of the biometric portion, and starts authentication of the biometric information (step S113). In this case, the biometric imaging unit 105 controlled by the imaging control unit 103 takes an image of the biometric portion, and the biometric information extraction unit 107 extracts predetermined biometric information from the obtained biometric image data. Thereafter, the authentication processing unit 113 of the biometric authentication unit 109 carries out biometric authentication processing using the registered biometric information associated with the account ID notified by the login processing unit 101 and the extracted biometric information, and determines whether the authentication is successful or not (step S115).

When the authentication has failed, the login processing unit 101 displays, on the display unit (not shown), an error output indicating that the authentication has failed (step S117), and terminates the registration processing of user information.

On the other hand, in a case where new biometric information is registered without using registered biometric information, or in a case where the extracted biometric information has been successfully authenticated when registered biometric information is used, the information processing apparatus 10 obtains information about additional information and the account management method (step S171). When the user specifies the above information, the login processing unit 101 additionally writes the various kinds of information as shown in FIG. 12 in the generated user information. Thereafter, the login processing unit 101 performs the registration processing of the biometric information (step S119).

As described above, the information processing apparatus 10 according to the present embodiment performs the registration processing of user information. Therefore, a plurality of user accounts can be associated with one piece of biometric information.

[Login Processing Method]

Subsequently, the login processing method carried out by the information processing apparatus 10 according to the present modification will be explained in detail with reference to FIG. 14. FIG. 14 is a flowchart illustrating an example of the login processing method carried out by the information processing apparatus according to the present modification.

First, when a biometric portion of a user is located at a predetermined position of the information processing apparatus 10, the login processing unit 101 requests the imaging control unit 103 to start taking an image of the predetermined biometric portion, and starts obtaining biometric information (step S201). In this case, the biometric imaging unit 105 controlled by the imaging control unit 103 takes an image of the biometric portion, and the biometric information extraction unit 107 extracts predetermined biometric information from the obtained biometric image data. The authentication processing unit 113 of the biometric authentication unit 109 uses all the registered biometric information to determine whether there is any registered biometric information whose degree of similarity with the extracted biometric information is equal to or more than a predetermined threshold value (step S203).

When there is no registered biometric information whose degree of similarity calculated is determined to be equal to or more than the predetermined threshold value, the authentication processing unit 113 determines that the authentication of the extracted biometric information has failed, and notifies the failed authentication to the login processing unit 101. The login processing unit 101 receives the notification of the failed authentication, and causes the display control unit 115 to display, on the display unit (not shown), an error output indicating that the authentication has failed (step S205). Then, the login processing is terminated.

On the other hand, when there is registered biometric information whose degree of similarity calculated is determined to be equal to or more than the predetermined threshold value, the authentication processing unit 113 determines that the extracted biometric information has been successfully authenticated. In this case, the authentication processing unit 113 refers to the registered user information, and identifies user information associated with the corresponding registered biometric information. Thereby, the authentication processing unit 113 determines whether the successfully authenticated registered biometric information corresponds to a plurality of pieces of user information (step S207).

When the successfully authenticated registered biometric information does not correspond to a plurality of pieces of user information (in other words, the successfully authenticated registered biometric information corresponds to only one piece of user information), the authentication processing unit 113 notifies the account ID described in the corresponding user information to the login processing unit 101. Thereafter, the login processing unit 101 refers to the user information, and uses the corresponding account to carry out the login processing (step S271).

On the other hand, when the successfully authenticated registered biometric information corresponds to a plurality of pieces of user information, the authentication processing unit 113 notifies the login processing unit 101 of each of the account IDs described in the plurality of corresponding pieces of user information. Thereafter, the login processing unit 101 refers to the corresponding user information, and determines which account management method is specified (step S273).

When the account management method of the user information corresponding to the successfully authenticated registered biometric information is set to the method for using the selection processing performed by the user, the login processing unit 101 carries out the login processing according to the login processing method as shown in the first embodiment of the present invention. More specifically, the login processing unit 101 carries out the login processing to the account corresponding to the selection result of the account made by the user (step S275).

Alternatively, when the account management method of the user information corresponding to the successfully authenticated registered biometric information is set to the method for using the default setting, the login processing unit 101 carries out the login processing according to the login processing method as shown in the first modification of the present invention. More specifically, the login processing unit 101 refers to the information about the default setting included in the user information, and carries out the login processing to the account designated as default (step S277).

Still alternatively, when the account management method of the user information corresponding to the successfully authenticated registered biometric information is set to the method for using the additional operation information, the login processing unit 101 carries out the login processing according to the login processing method as shown in the second modification of the present invention. More specifically, the login processing unit 101 carries out the login processing to the account corresponding to the additional operation based on whether the additional operation has been performed appropriately or not (step S279).

Therefore, even though a plurality of pieces of user information are associated with one piece of registered biometric information, the user can easily log in to the particular account by just scanning the biometric portion while performing the predetermined additional operation. As a result, in the information processing apparatus 10 according to the present modification, the convenience for the user can be improved.

(Hardware Configuration)

Figure 15:
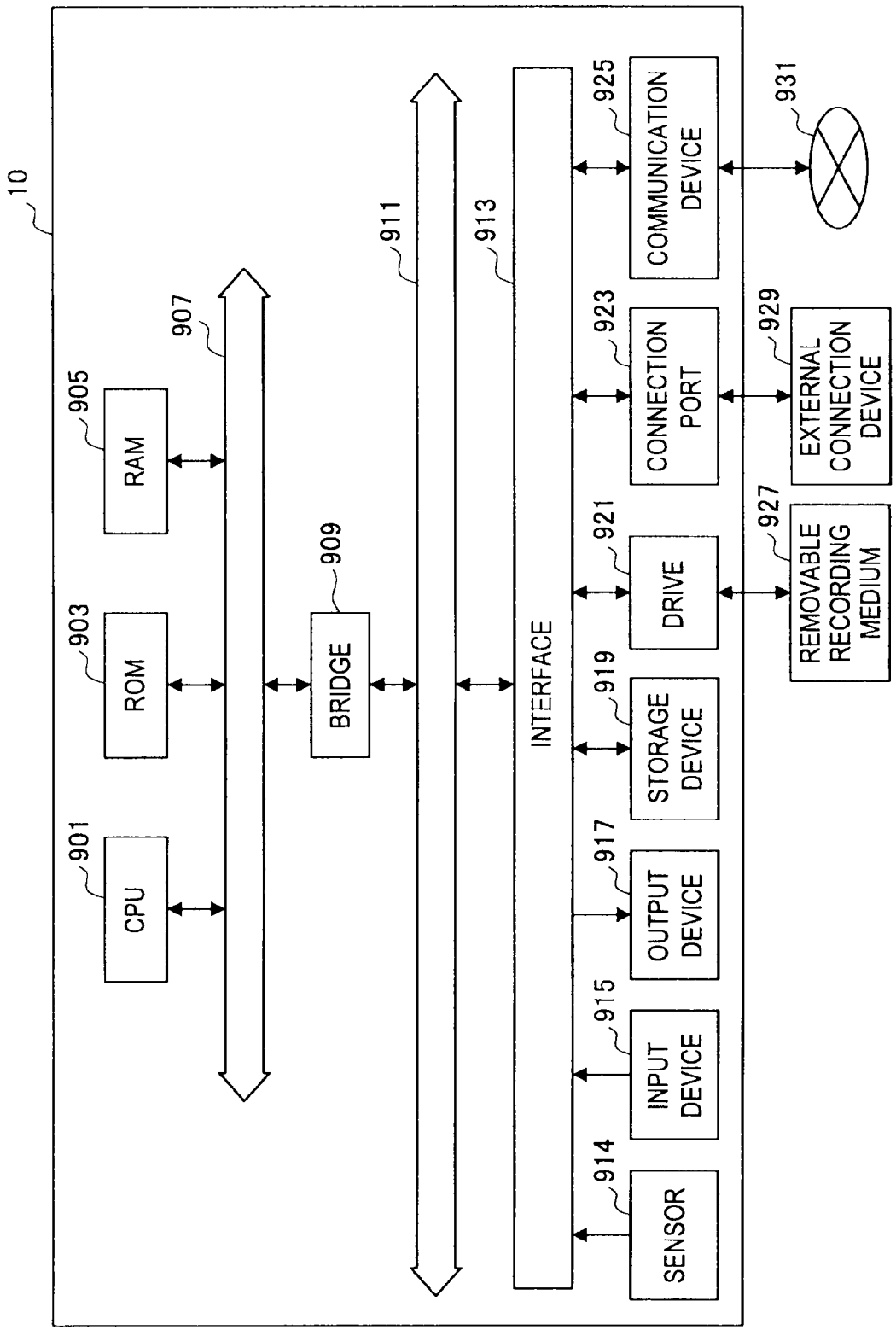
FIG. 15 is a block diagram illustrating a hardware configuration of the information processing apparatus according to the embodiment of the present invention.

Next, the hardware configuration of the information processing apparatus 10 according to the embodiment of the present invention will be described in detail with reference to FIG. 15. FIG. 15 is a block diagram for illustrating the hardware configuration of the information processing apparatus 10 according to the embodiment of the present invention.

The information processing apparatus 10 mainly includes a CPU 901, a ROM 903, and a RAM 905. Furthermore, the information processing apparatus 10 also includes a host bus 907, a bridge 909, an external bus 911, an interface 913, a sensor 914, an input device 915, an output device 917, a storage device 919, a drive 921, a connection port 923, and a communication device 925.

The CPU 901 serves as an arithmetic processing apparatus and a control device, and controls the overall operation or a part of the operation of the information processing apparatus 10 according to various programs recorded in the ROM 903, the RAM 905, the storage device 919, or a removable recording medium 927. The ROM 903 stores programs, operation parameters, and the like used by the CPU 901. The RAM 905 primarily stores programs used in execution of the CPU 901 and parameters and the like varying as appropriate during the execution. These are connected with each other via the host bus 907 configured from an internal bus such as a CPU bus or the like.

The host bus 907 is connected to the external bus 911 such as a PCI (Peripheral Component Interconnect/Interface) bus via the bridge 909.

The sensor 914 is detection means for detecting, for example, biometric information unique to a user or various kinds of information used for obtaining such biometric information. Examples of this sensor 914 include various kinds of imaging devices such as a CCD (Charge Coupled Device), and a CMOS (Complementary Metal Oxide Semiconductor). Further, the sensor 914 may include, for example, a light source and an optical system such as a lens used to take an image of a biometric portion. Alternatively, the sensor 914 may be a microphone and the like for obtaining audio and the like. It should be noted that the sensor 914 may include not only the above but also various kinds of measuring apparatuses such as a thermometer, a illumination meter, a hygrometer, a speedometer, and an accelerometer.

The input device 915 is an operation means operated by a user, such as a mouse, a keyboard, a touch panel, buttons, a switch and a lever. Also, the input device 915 may be a remote control means (a so-called remote control) using, for example, infrared light or other radio waves, or may be an externally connected device 929 such as a mobile phone or a PDA conforming to the operation of the information processing apparatus 10. Furthermore, the input device 915 generates an input signal based on, for example, information which is input by a user with the above operation means, and is configured from an input control circuit for outputting the input signal to the CPU 901. The user of the information processing apparatus 10 can input various data to the information processing apparatus 10 and can instruct the information processing apparatus 10 to perform processing by operating this input apparatus 915.

The output device 917 is configured from a device capable of visually or audibly notifying acquired information to a user. Examples of such device include display devices such as a CRT display device, a liquid crystal display device, a plasma display device, an EL display device and lamps, audio output devices such as a speaker and a headphone, a printer, a mobile phone, a facsimile machine, and the like. For example, the output device 917 outputs a result obtained by various processings performed by the information processing apparatus 10. More specifically, the display device displays, in the form of texts or images, a result obtained by various processes performed by the information processing apparatus 10. On the other hand, the audio output device converts an audio signal such as reproduced audio data and sound data into an analog signal, and outputs the analog signal.

The storage device 919 is a device for storing data configured as an example of a storage unit of the information processing apparatus 10 and is used to store data. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, various data, and various data obtained from the outside.

The drive 921 is a reader/writer for recording medium, and is embedded in the information processing apparatus 10 or attached externally thereto. The drive 921 reads information recorded in the attached removable recording medium 927 such as a magnetic disk, an optical disk, a magneto-optical disk, or a semiconductor memory, and outputs the read information to the RAM 905. Furthermore, the drive 921 can write in the attached removable recording medium 927 such as a magnetic disk, an optical disk, a magneto-optical disk, or a semiconductor memory. The removable recording medium 927 is, for example, a DVD medium, an HD-DVD medium, or a Blu-ray medium. The removable recording medium 927 may be a CompactFlash (CF; registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing devices to directly connect to the information processing apparatus 10. Examples of the connection port 923 include a USB (Universal Serial Bus) port, an IEEE1394 port, a SCSI (Small Computer System Interface) port, and the like. Other examples of the connection port 923 include an RS-232C port, an optical audio terminal, an HDMI (High-Definition Multimedia Interface) port, and the like. By the externally connected apparatus 929 connecting to this connection port 923, the information processing apparatus 10 directly obtains various data from the externally connected apparatus 929 and provides various data to the externally connected apparatus 929.

The communication device 925 is a communication interface configured from, for example, a communication device for connecting to a communication network 931. The communication device 925 is, for example, a wired or wireless LAN (Local Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 is configured from a network and the like, which is connected via wire or wirelessly, and may be, for example, the Internet, a home LAN, infrared communication, radio wave communication, satellite communication, or the like.

Heretofore, an example of the hardware configuration capable of realizing the functions of the information processing apparatus 10 according to the embodiment of the present invention has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

(Summary)

As explained above, the following case may have to be considered. When a user uses a certain information processing apparatus, the user may have a plurality of accounts for different authorities to be executed, and may want to assign different accounts to different uses such as home use and office use. In such a case, in the information processing apparatus according to the embodiments and the modifications of the present invention as explained above, one piece of registered biometric information may be shared by a plurality of pieces of user information (i.e., accounts). Therefore, the convenience for the user can be improved by the information processing apparatus according to the embodiments and the modifications of the present invention as explained above.

An example of the login processing method heretofore used includes a method for using not only an account ID but also a password. In this case, when the user logs in to an information processing apparatus, the ID and the password are input to the apparatus without distinguishing the accounts. However, the drawback of the method using the password is a lack of variation of the password.

Many users are afraid of forgetting passwords, and the users prefer using an easy-to-remember text string, a short text string, a text string having a meaning, and the like as a password, to using a random, long test string. Therefore, for example, when an English-Japanese dictionary is considered, a space from which a user can choose passwords is considered to include about several thousand to one million passwords. On the other hand, there is a system allowing only a limited range of options, i.e., only 10000 options, such as PIN numbers for ATM of a bank.

Suppose that M users randomly choose passwords from N options. In this case, according to a theory called Birthday Paradox, it is known that when the number M of users is $N^{1/2}$ or more, the chance of coincidence of passwords becomes more than ½. Therefore, in the system in which the password space includes 10000 options and which has more than 100 users, or in the case of 1 million options with more than 1000 users, the chance that a plurality of users select the same password is more than ½. In such a situation, the following case is considered: a user inputs a password without specifying an account, and the system presents a list of accounts associated with the password. In this case, there is a drawback in that another user may use the same password to log in to another account different from the account that should be managed by a user.

On the other hand, when a user distinguishing method using biometric information is used, a wide range of options are available as biometric information. This can be easily expected from that fact that it is impossible to obtain the same information when biometric information on the same portion of the same user is presented to the system a plurality of times. This is because a mechanism for reading the biometric information handles analog information such as images and audio. Accordingly, in individual authentication using biometric information, presented data are hardly in complete agreement with registered biometric information. When the data somewhat agrees within a range of error, the authentication is deemed to have succeeded. Also for this reason, it is expected that accidental agreement of registration information hardly occurs when the biometric information is used as the password.

As described above, in the information processing apparatus according to the embodiments and the modifications of the present invention using biometric authentication processing, the convenience for the user can be improved while maintaining the security of the apparatus itself.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-264821 filed in the Japan Patent Office on Nov. 20, 2009, the entire content of which is hereby incorporated by reference.

What is claimed is:

1. An information processing apparatus comprising:
a biometric authentication unit that performs authentication processing of received biometric information associated with one input instance of a particular biometric type, the authentication processing being based on previously registered biometric information of the particular biometric type, the received biometric information being information unique to a living body, a notification being provided based on a determination that the received biometric information is successfully authenticated; and
a login processing unit that performs login processing and completes the login processing based on user specification information for specifying user information used for the login processing, the login processing including determining whether the successfully authenticated biometric information corresponds to a plurality of user accounts each corresponding to pieces of user information,
when the login processing unit determines that the successfully authenticated biometric information does not correspond to the plurality of user accounts, the login processing unit automatically logs in and completes the login processing, and
when the login processing unit determines that the successfully authenticated biometric information does correspond to the plurality of user accounts, the login processing unit automatically logs in to a default account of the plurality of user accounts and completes the login processing.

2. The information processing apparatus according to claim 1,
wherein when performing an operation for switching from a currently logged in user account to a new user account, the login processing unit determines whether biometric information associated with the new user account is the same as biometric information associated with the currently logged in user account, and
when the biometric information associated with the new user account is determined to be the same as the biometric information associated with the currently logged in user account, the login processing unit performs login processing regarding the new user account without the biometric authentication unit performing authentication processing.

3. The information processing apparatus according to claim 2,
wherein when new user information is to be associated with already registered biometric information during registration of the new user account, the biometric authentication unit associates the already registered biometric information with the new user information when newly obtained biometric information and the already registered biometric information are successfully authenticated.

4. The information processing apparatus according to claim 3,
wherein when the already registered biometric information is associated with the new user account, the biometric authentication unit also generates the user specification information to be referred to during login processing using the already registered biometric information.

5. The information processing apparatus according to claim 1,
wherein the login processing unit displays, on a display screen, an object representing the pieces of user information associated with the successfully authenticated biometric information, and adopts, as the user specification information, information identifying a selected user account selected in response to the login processing.

6. The information processing apparatus according to claim 1,
wherein user login processing information for login processing is previously set as the user specification information.

7. The information processing apparatus according to claim 1,
wherein user specification information includes additional operation information regarding at least one additional to-be-performed operation during the login processing using predetermined user information, and
the login processing unit completes the login processing based on whether the at least one additional operation is performed or not during the login processing.

8. An information processing method comprising:
authenticating, using a hardware processor, received biometric information associated with one input instance of a particular biometric type, the authenticating being based on previously registered biometric information, the received biometric information being information unique to a living body, a notification being provided based on a determination that the received biometric information is successfully authenticated; and
performing, using the hardware processor, login processing and completion of the login processing based on user specification information for specifying user information used for the login processing, the login processing including determining whether the successfully authenticated biometric information corresponds to a plurality of user accounts each corresponding to pieces of user information,
when said determining determines that the successfully authenticated biometric information does not correspond to the plurality of user accounts, automatically logging in and completing the login processing, and
when said determining determines that the successfully authenticated biometric information does correspond to the plurality of user accounts, automatically logging in to a default account of the plurality of user accounts and completing the login processing.

9. A non-transitory computer readable storage medium encoded with computer program instructions, which when executed by a computer, cause the computer to implement a method, comprising:
authenticating received biometric information associated with one input instance of a particular biometric type, the authenticating being based on previously registered biometric information, the received biometric information being information unique to a living body, a notification being provided based on a determination that the received biometric information is successfully authenticated; and
performing login processing and completion of the login processing based on user specification information for specifying user information used for the login processing, the login processing including determining whether the successfully authenticated biometric information corresponds to a plurality of user accounts each corresponding to pieces of user information,
when said determining determines that the successfully authenticated biometric information does not correspond to the plurality of user accounts, automatically logging in and completing the login processing, and
when said determining determines that the successfully authenticated biometric information does correspond to the plurality of user accounts, automatically logging in to a default account of the plurality of user accounts and completing the login processing.

10. The information processing apparatus according to claim 1,
wherein the login processing and completion thereof is performed without password entry by a user.

11. The information processing apparatus according to claim 6,
wherein the user login processing information for login processing includes one or more of information for specifying default user information used during the login processing, information for specifying an order of priority of the pieces of user information associated with the selected user account, and conditions for determining the priority order.

12. The information processing method according to claim 8,
wherein the login processing and completion thereof is performed without password entry by a user.

13. The information processing method according to claim 8, further comprising switching from a currently logged in user account to another user account without further biometric authentication.

14. The information processing method according to claim 13,
wherein said switching to another user account includes performing login processing regarding the another user account and is based on a determination that the registered biometric information associated with the currently logged in user account is also associated with the another user account.

15. The non-transitory computer readable storage medium according to claim 9,
wherein the login processing and completion thereof is performed without password entry by a user.

16. The non-transitory computer readable storage medium according to claim 9, further comprising switching from a currently logged in user account to another user account without further biometric authentication.

17. The non-transitory computer readable storage medium according to claim 16,
wherein said switching to another user account includes performing login processing regarding the another user account and is based on a determination that the registered biometric information associated with the currently logged in user account is also associated with the another user account.

18. The information processing apparatus according to claim 1, wherein, prior to the automatically logging in to the default account of the plurality of user accounts and completion of the login processing when said determining determines that the successfully authenticated biometric information corresponds to the plurality of user accounts, the log in processing unit performs an account management operation to determine whether to perform the automatically logging in to the default account, to notify and receive a user selection of one of the plurality of user accounts for logging in, or to notify and receive a user input regarding an additional operation prior to completion of the log in processing.

19. The information processing method according to claim 8,
wherein, prior to the automatically logging in to the default account of the plurality of user accounts and completion of the login processing when said determining determines that the successfully authenticated biometric information corresponds to the plurality of user accounts, performing an account management operation to determine whether to perform the automatically logging in to the default account, to notify and receive a user selection of one of the plurality of user accounts for logging in, or to notify and receive a user input regarding an additional operation prior to completion of the log in processing.

20. The non-transitory computer readable storage medium according to claim 9,
wherein, prior to the automatically logging in to the default account of the plurality of user accounts and completion of the login processing when said determining determines that the successfully authenticated biometric information corresponds to the plurality of user accounts, the log in processing unit performs an account management operation to determine whether to perform the automatically logging in to the default account, to notify and receive a user selection of one of the plurality of user accounts for logging in, or to notify and receive a user input regarding an additional operation prior to completion of the log in processing.

* * * * *